United States Patent [19]
Hirasawa

[11] Patent Number: 5,986,706
[45] Date of Patent: *Nov. 16, 1999

[54] ELECTRONIC APPARATUS

[75] Inventor: Masahide Hirasawa, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,837

[22] Filed: Oct. 15, 1996

Related U.S. Application Data

[63] Continuation of application No. 08/278,071, Jul. 20, 1994, abandoned.

[30]     Foreign Application Priority Data

Jul. 22, 1993  [JP]  Japan ................................. 5-201243
Sep. 29, 1993  [JP]  Japan ................................. 5-242517

[51] Int. Cl.$^6$ .................................................. H04N 5/225
[52] U.S. Cl. ............................................................ 348/372
[58] Field of Search ................................. 348/207, 372, 348/231; 396/277, 228, 279, 301; H04N 5/225

[56]                References Cited

U.S. PATENT DOCUMENTS 4,645,326  2/1987  Kiuchi et al. ........................... 354/484

*Primary Examiner*—Tuan Ho
*Attorney, Agent, or Firm*—Robin, Blecker & Daley

[57]                ABSTRACT

An electronic apparatus includes a storage circuit arranged to store information on a controlled target, a storage control circuit arranged to rewrite the information stored in the storage circuit or to add different information to the information stored in the storage circuit, a power-decreased state detecting circuit arranged to detect an output state of a power source battery, and a control circuit arranged to control actions of the storage circuit and the storage control circuit according to an output of the power-decreased state detecting circuit.

26 Claims, 34 Drawing Sheets

ELECTRONIC APPARATUS

This is a continuation application under 37 CFR 1.62 of prior application Ser. No. 08/278,071, filed Jul. 20, 1994, abandoned.

BACKGROUND OF THE INVENTION

1. Field of the Invention

This invention relates to an electronic apparatus having a storage memory arranged to store conditions of control over the apparatus and other information.

2. Description of the Related Art

The recent advancement of electronic technology has lessened troublesome operations and processes to be performed by operators or users on various apparatuses or equipment manufactured. The electronic technology is now further advancing to provide such an apparatus that is arranged to read what is intended by the operator and to carry out automatic control accordingly.

FIG. 1 shows in a block diagram an example of a control device of a video camera which has prompted the invention of the present application. The control device is of such a system that enables the video camera to read out what is intended by the operator of the video camera and carries out automatic control according to the intention of the operator. More specifically, the control device sees where the visual line of the operator peeping into a viewfinder is directed within an image plane and causes the focal point of an optical system to be adjusted to an object of shooting at which the operator is looking. In other words, the system includes an automatic focusing control circuit which is arranged to have the optical system focused only on an object of shooting at which the operator is looking. Such a technique has been disclosed, for example, in Japanese Patent Applications No. HEI 4-314408 and No. HEI 3-218574.

Referring to FIG. 1, an infrared ray generating device 1 is arranged within a viewfinder unit to illuminate an eyeball 3 of the operator with infrared radiation through an eyepiece 2. The infrared radiation is reflected by the eyeball 3. The reflected infrared radiation is received by a photo-electric converting element 4. A visual line position analyzer 5 is connected to the photo-electric converting element 4 and is arranged to find at which objects of shooting the operator is looking. An arithmetic control device 6 which is composed of a microcomputer, etc., is connected to the visual line position analyzer 5. The arithmetic control device 6 is thus arranged to obtain information on the position of the visual line from the visual line position analyzer 5 and to compute and obtain the coordinates of the visual line within an image plane.

A character generator 7 is connected to the arithmetic control device 6 and is arranged to be used for displaying in characters the visual line position of the operator recognized by the video camera along with some other control information. A display driving device 8 is connected to the character generator 7. A signal formed by the display driving device 8 is supplied to a monitor 9 which is disposed in front of the eyepiece 2.

A lens optical system includes elements arranged to face an object of shooting 10, in alignment, in the order of a focusing lens 11, a variator lens 12, a diaphragm 13 and an image pickup photo-electric converting element 14, which is a CCD or the like. The image pickup photo-electric converting element 14 is arranged to output a video signal. The video signal is supplied to the display driving device 8. An image is displayed at the monitor 9 with the output of the character generator 7 superimposed thereon to permit sighting of it through the eyepiece 2. Further, the output of the image pickup photo-electric converting element 14 is supplied to an AF (automatic focusing) signal processing circuit 67. The output of the AF signal processing circuit 67 is supplied to a control unit 21 which will be described later. The focus is adjusted by moving the focusing lens 11 according to the output of the AF signal processing circuit 67. At that time, if the focus is to be adjusted to an object located in the position of the visual line, a distance measuring area which is not shown is shifted to the visual line position and the focusing action is carried out on the basis of information on an image located within the distance measuring area. The focusing lens 11 is connected to an actuator 15 which is a mechanism arranged to move the focusing lens 11 in the direction of an optical axis with a motor used as a drive source. The variator 12 is also arranged to be moved by an actuator 16 which is connected to the variator lens 12. Another actuator 17 is connected to the diaphragm 13 and is arranged to vary the aperture of the diaphragm 13.

These actuators 15, 16 and 17 are respectively connected to drivers 18, 19 and 20. These drivers 18, 19 and 20 are connected to the control unit 21, which is arranged to control the system and to exchange information with the arithmetic control device 6. A pull-up resistor 22 is connected between the control unit 21 and a power supply. A switch 26 is arranged between the low potential side of the pull-up resistor 22 and the ground. The arithmetic control device 6 is provided with a pull-up resistor 27 connected between the arithmetic control device 6 and a power supply. A switch 28 is disposed between the low potential side of the pull-up resistor 27 and the ground. A power supply circuit 33 is connected to the control unit 21 through lines 29, 30, 31 and 32.

The lines 29 and 30 are arranged to transmit to the control unit 21 information on a power-decreased state of a battery 36. The line 31 is for control over a supply of power to a 5 V line which is provided for the supply of the voltage of a power source of 5 V. The line 32 is arranged to constantly supply the power to the control unit 21 as long as the battery 36 is mounted. Further, the power supply circuit 33 is provided with a line 34 for outputting the power source voltage of 5 V and an unregulated line 35 for supplying the output of the battery 36 directly to the necessary part of the video camera without passing through any constant voltage circuit. The battery 36 is either a primary battery which is a manganese cell or the like and is usable only once or a secondary battery which is a nickel-cadmium battery and is rechargeable. A synchronizing signal generating circuit 37 is connected to the arithmetic control device 6 and the character generator 7. A driving circuit 38 which is connected to the synchronizing signal generating circuit 37 is arranged to drive the image pickup photoelectric converting element 14.

FIG. 2 is a circuit diagram showing the details of the power supply circuit 33. The power supply circuit 33 is arranged to convert the voltage of the battery 36 into a power supply voltage (5 V, for example) for IC circuits disposed within the video camera, to supply information on the power-decreased state (a state obtained when electric power supply capability decreases with a terminal voltage dropped) to the control unit 21 and, in a case where an instruction for bringing the supply of power to an end is given from the control unit 21, to bring the supply of power to the 5 V line 34 to an end.

The power supply circuit 33 consists of DC—DC converters 39 and 40, resistors 41 and 42 which are connected between the ground and the outputs of the DC—DC converters 39 and 40, resistors 44 and 45 which are connected between the battery 36 and the ground, a comparator 47 having the voltage of a connection node 43 between the resistors 41 and 42 and that of a connection node 46 between the resistors 44 and 45 respectively as its input signals, resistors 48 and 49 connected between the output terminal of the DC—DC converter 40 and the ground, resistors 51 and 52 connected between the battery 36 and the ground, a comparator 54 having the voltage of a connection node 50 between the resistors 48 and 49 and that of a connection node 53 between the resistors 51 and 52 respectively as its input signals, and a switch 55 which is disposed between the output terminal of the DC—DC converter 39 and the line 34.

The voltage of the battery 36 is converted into a DC voltage of 5 V by the DC—DC converter 40. The DC voltage thus obtained is divided by the resistors 41 and 42 into a reference voltage V1 and also divided by the resistors 48 and 49 into a reference voltage V2. The reference voltage V1 is arranged to be larger than the other reference voltage V2. The voltage of the battery 36 is further divided by the resistors 44 and 45 into a voltage V3 and by the resistors 51 and 52 into a voltage V4. The reference voltage V1 and the voltage V3 are compared with each other by the comparator 47 while the reference voltage V2 and the voltage V4 are arranged to be compared with each other by the comparator 54.

When the voltage V1 is found to be larger than the voltage V3, the comparator 47 outputs to the line 30 a signal indicating a power-decreased state (indicating that the battery voltage has dropped to such a level that requires replacement of the battery). Upon receipt of this signal, the control unit 21 causes the monitor 9 to make a power-decrease display through the arithmetic control device 6, the character generator 7 and the display driving device 8.

The power-decrease display is made as shown in FIG. 3. A display image plane 1801 shows a power-decrease display 1802 such as "BATT", an image 1803 of an object, and calibration markers 1804 and 1805 for adjustment of a difference in visual line function between the individual operators (hereinafter will be referred to as a personal error). The power-decrease display "BATT" 1802 is made by causing it to flicker. In using the monitor 9, when the operator closes the switch 26 of FIG. 1 to select a visual-line function personal-error adjustment mode, the visual-line function personal-error adjusting markers 1804 and 1805 are displayed on the display image plane 1801. Then, the operator first looks at the marker 1804 and closes the switch 28. By this operation, the position of a visual line which is obtained when the operator looks at the marker 1804 is confirmed. Following this, another visual line position which is obtained when the operator looks at the other marker 1805 is confirmed.

Then, "information on coincidence of the recognition by the apparatus with the visual lines of the operator" obtained when the operator looks at the visual-line function personal-error adjusting markers 1804 and 1805 is stored in a storage part within the arithmetic control device 6. After that, each visual line of the operator is examined on the basis of this information.

When the voltage of the battery 36 further drops until the other reference voltage V2 becomes higher than the voltage V4 after the power-decrease display is made, the comparator 54 outputs to the line 29 a signal for shutting off the power.

According to this signal, the control unit 21 opens the switch 55 to cut off the supply of power to each block to forcibly bring the operation of the system to a stop, so that the system can be prevented from coming out of order or from malfunctioning.

In cases where an apparatus is arranged to observe the visual lines of the operators and to control its actions according to these visual lines, the control must be performed after adjustment is made to the personal error of each of the operators according to the personal error of each operator, because the visual lines of one operator differ from those of another.

FIG. 4 is a block diagram showing in detail the internal arrangement of the arithmetic control device 6. The arithmetic control device 6 consists of a storage part 6a which is arranged to carry out an arithmetic process for control and includes a temporary information storing device and another storage part 6b which is arranged to store information on a personal error or nontemporary information which is stored as long as the information is not erased by the operator or a person adjusting the camera. The storage part 6b is composed of an element such as an EEPROM or the like that inhibits erasing and writing unless some special process is performed. The contents of the storage part 6b cannot be updated without using a specific program or a specific instruction. The information on the personal error thus stored is used for operations to be performed thereafter.

However, with the video camera arranged in the manner as described above, the provision of the function of adjusting the personal error of the visual line of the operator tends to bring about the following problem.

Since the duration time of one battery is only one or two hours in general, the power is frequently shut off. The personal error adjusting function, on the hand, can be carried out any time as desired. In a case where the information on the personal error is to be stored in an element such as an EEPROM or the like that is dependent on a run command coming from an external software, if the supply of power becomes unstable while the storing action on the storage part is still in process, some malfunction tends to take place. For example, in such a case, some unspecified figure might be written in as data other than the data of a predetermined address, or some part other than a designated part might be erased in error. Further, if the power is actually shut off due to a power decrease within a period of limited time necessary for writing, it becomes hardly possible to correctly judge the content of the storage part to be a value obtained prior to the data currently applicable, or to be representing a state obtained after completion of rewriting or to be a totally wrong value. Under such a condition, the reliability of the data in storage itself would be lost.

If any abnormal data is stored in the storage part in this manner, a part of a program might become hardly executable. In such a case, even if the operator makes adjustment according to predetermined procedures, the apparatus might fail to smoothly operate.

SUMMARY OF THE INVENTION

It is an object of this invention to provide an electronic apparatus which is capable of preventing the destruction of the contents of storage and eliminating any impediment to the execution of the visual-line personal-error adjustment due to the power-decreased state mentioned in the foregoing.

To attain this object, an electronic apparatus arranged as a preferred embodiment of this invention includes storage means for storing information on a controlled target, storage control means for rewriting the information stored in the storage means or for adding different information to the information stored in the storage means, power-decreased state detecting means for detecting an output state of a power source battery, and control means for making a selection between execution and nonexecution of the storage means and the storage control means on the basis of the detection made by the power-decreased state detecting means.

The electronic apparatus which is a preferred embodiment of this invention is arranged to enhance its operability by further including means for allowing the operator to know through a display or the like the execution or nonexecution selected by the control means.

The electronic apparatus which is a preferred embodiment of this invention is arranged to prevent a power-decreased state from taking place while the visual-line personal-error adjustment is in process by setting a power-decreased state detection threshold value in such a way as to limit the length of time of adjustment and to ensure that the power-deceased state never takes place within the adjustment time.

Further, in the electronic apparatus which is a preferred embodiment of this invention, the power-decreased state detecting means is arranged such that its conditions of detection are variable and that the conditions of detection can be varied in response to completion or stopping of execution of the storage means or the storage control means.

It is another object of this invention to provide an electronic apparatus which is capable of preventing the contents of storage from being destroyed by a decrease in power, the apparatus being arranged such that, when a personal error of the visual line of the operator of the video camera is to be adjusted in making visual-line adjustment or when information on a specific condition, etc., desired by the operator is to be written or stored in a storage medium, the power-decreased state of a power supply battery is detected and then a selection is made between execution or nonexecution of the storing action or the visual-line adjustment, etc., according to the result of detection of the state of power supply (according to the result of a check for a sufficient battery capacity).

It is a further object of this invention to provide an electronic apparatus which is arranged to have an improved operability by informing the operator of the current operating state of the apparatus through a display on a monitor as to whether visual-line adjustment, etc., are executable or not.

To attain that object, the electronic apparatus which is an embodiment of this invention is arranged as follows. In executing the actions of the storage means and the storage control means, a limit is set to the length of time of the execution with a power-decreased state detection threshold value set in such a way as to have no power-decreased state take place within the limited time. The power-decreased state detecting means is arranged to be capable of varying the conditions of detection and to vary the conditions of detection only upon completion or stopping of the operation of the storage or storage control means, so that the contents of storage can be rewritten only when the power supply is in a stable state and can be prevented from being destroyed.

These and other objects and features of this invention will become apparent from the following detailed description of embodiments thereof taken in conjunction with the accompanying drawings.

DETAILED DESCRIPTION OF THE PREFERRED EMBODIMENTS

Embodiments of this invention are described below with reference to the accompanying drawings.

Figure 5:
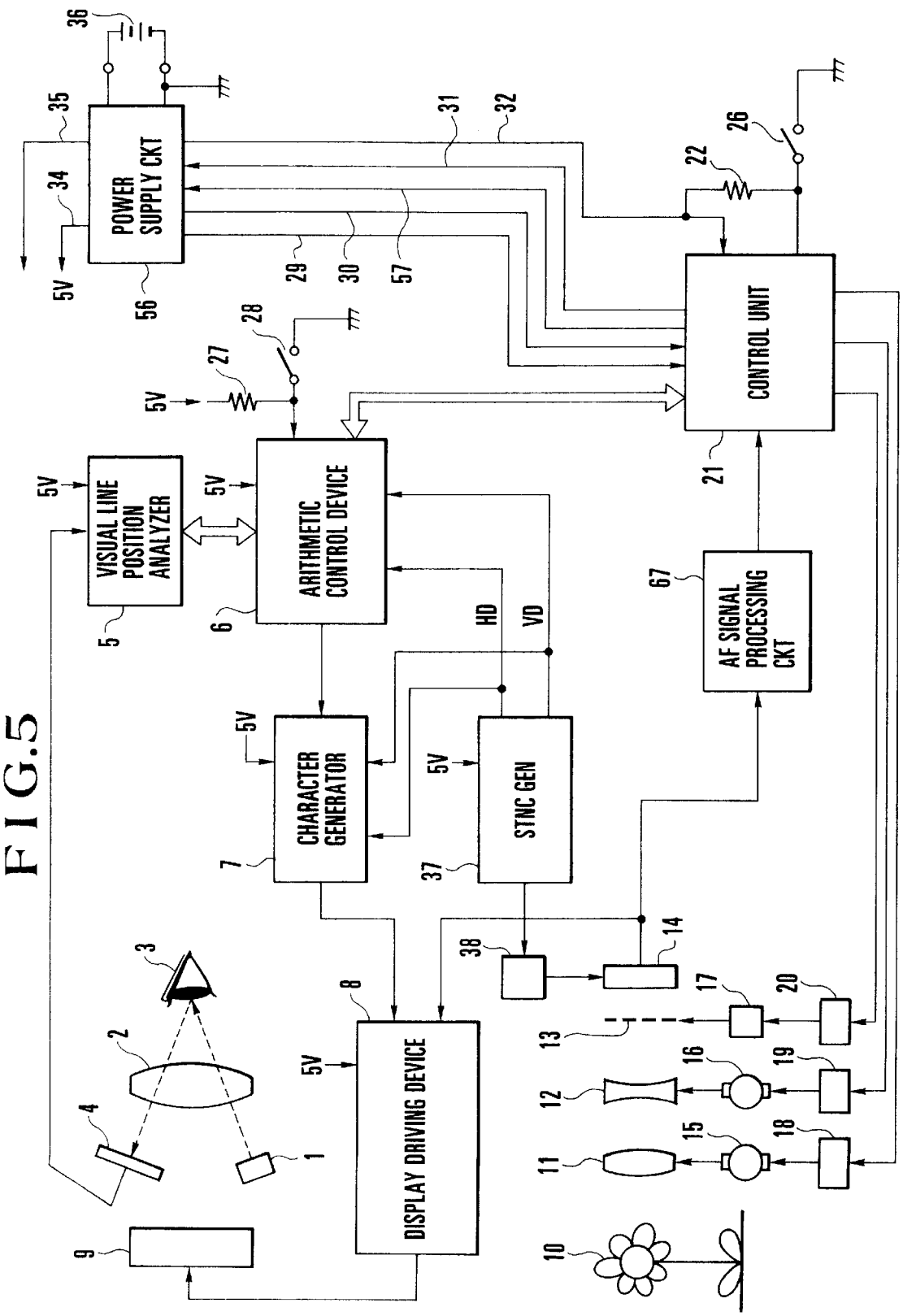
FIG. 5 is a block diagram showing an electronic apparatus arranged as an embodiment of this invention.

FIG. 5 shows in a block diagram the arrangement of an electronic apparatus, or a video camera, arranged as a first embodiment of this invention. In FIG. 5, the same parts as those shown in FIG. 1 are indicated by the same reference numerals and the details of them are omitted from the following description to avoid duplication.

Figure 1:
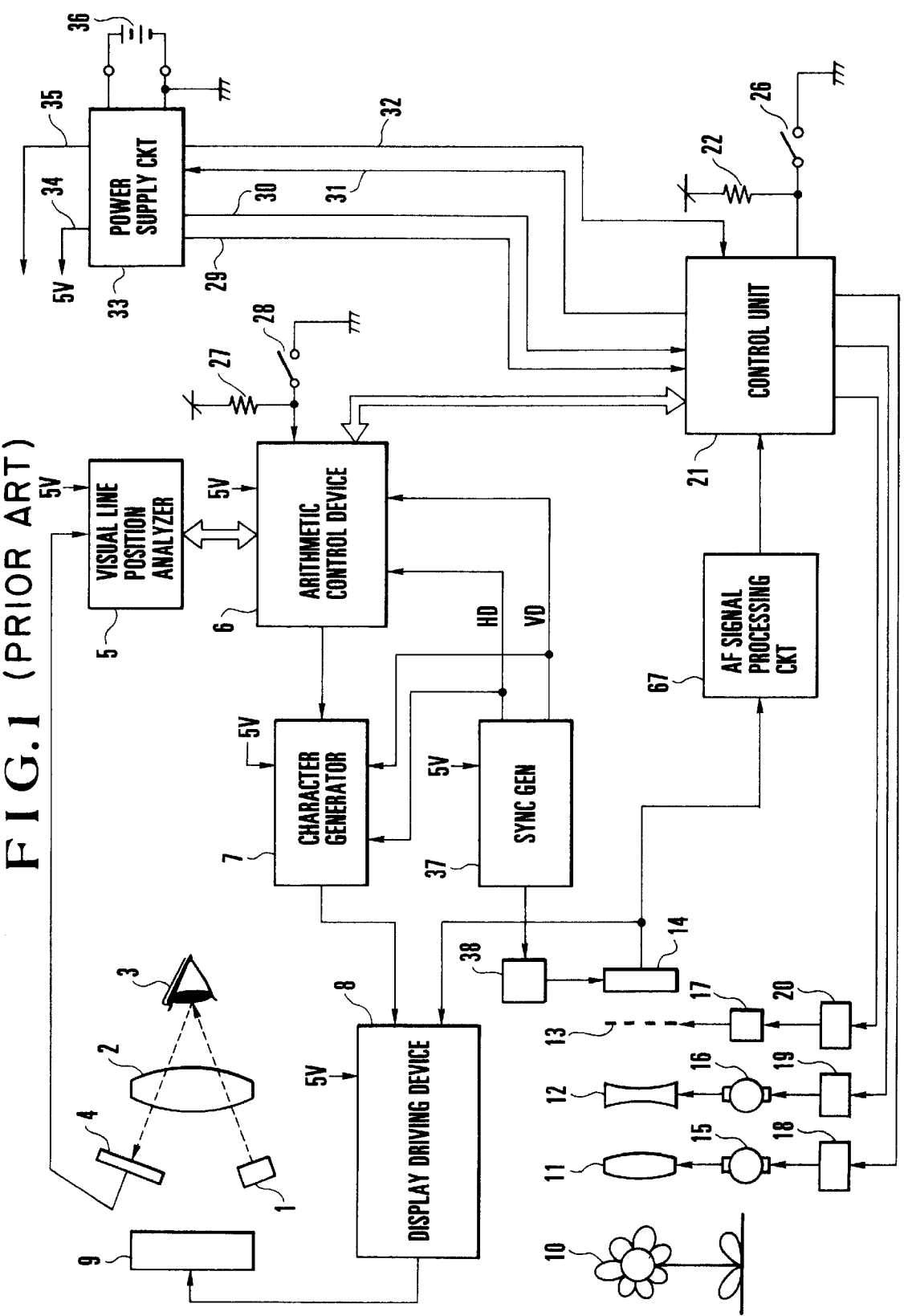
FIG. 1 is a block diagram showing by way of example the control arrangement of a video camera on which this invention is based.

As shown in FIG. 5, the fundamental arrangement of the video camera is the same as the arrangement of the prior art shown in FIG. 1. The embodiment, however, differs from the prior art arrangement in the following points. The power supply circuit 33 of FIG. 1 is replaced with a power supply circuit 56 which is provided with reference voltage varying means. A line 57 is provided between the power supply circuit 56 and the control unit 21. A signal for varying a reference voltage to be used by a comparator included in the power supply circuit 56 is arranged to be outputted from the control unit 21 to the line 57.

Figure 2:
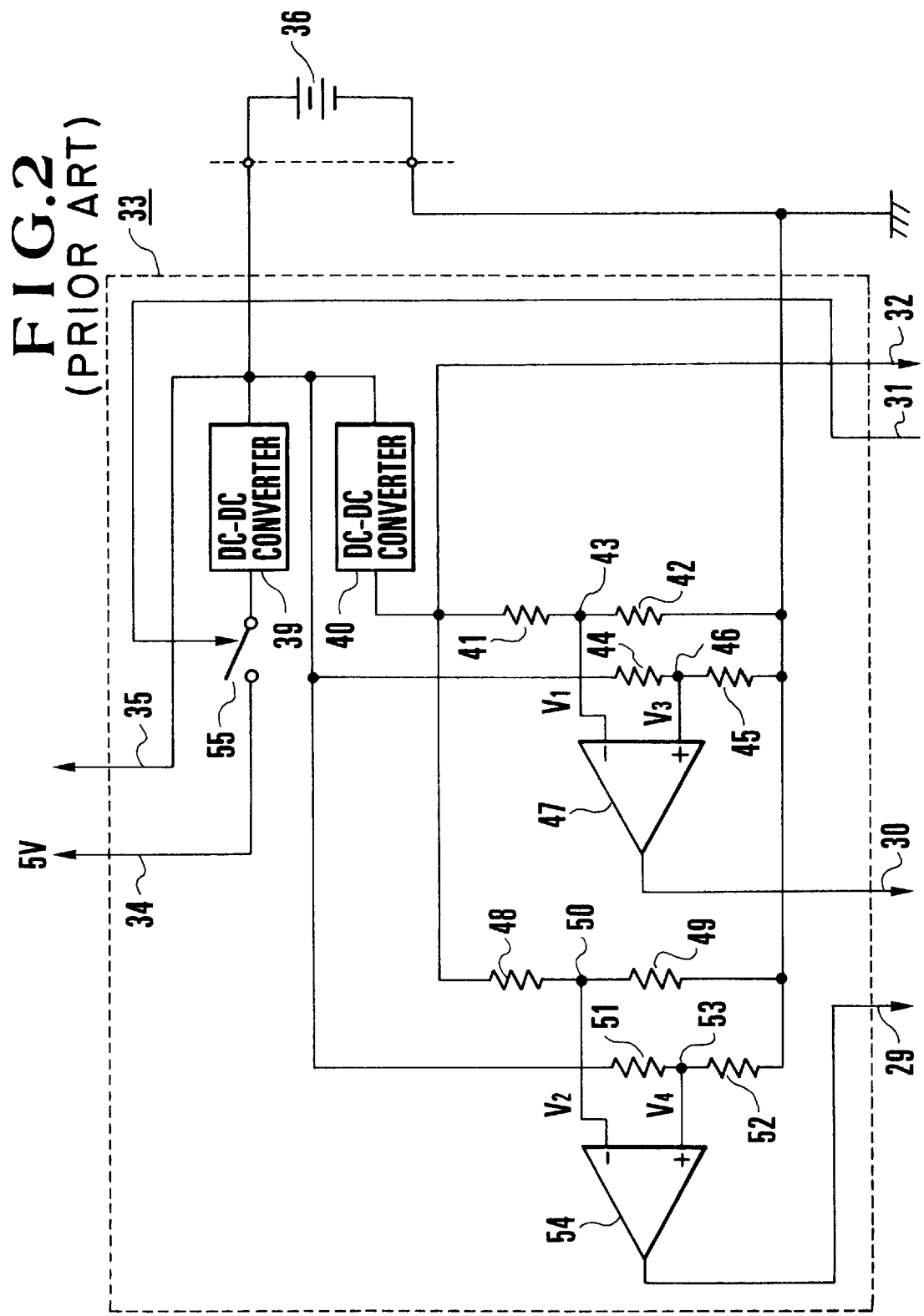
FIG. 2 is a circuit diagram showing in detail the arrangement of a power supply circuit shown in FIG. 1.
Figure 6:
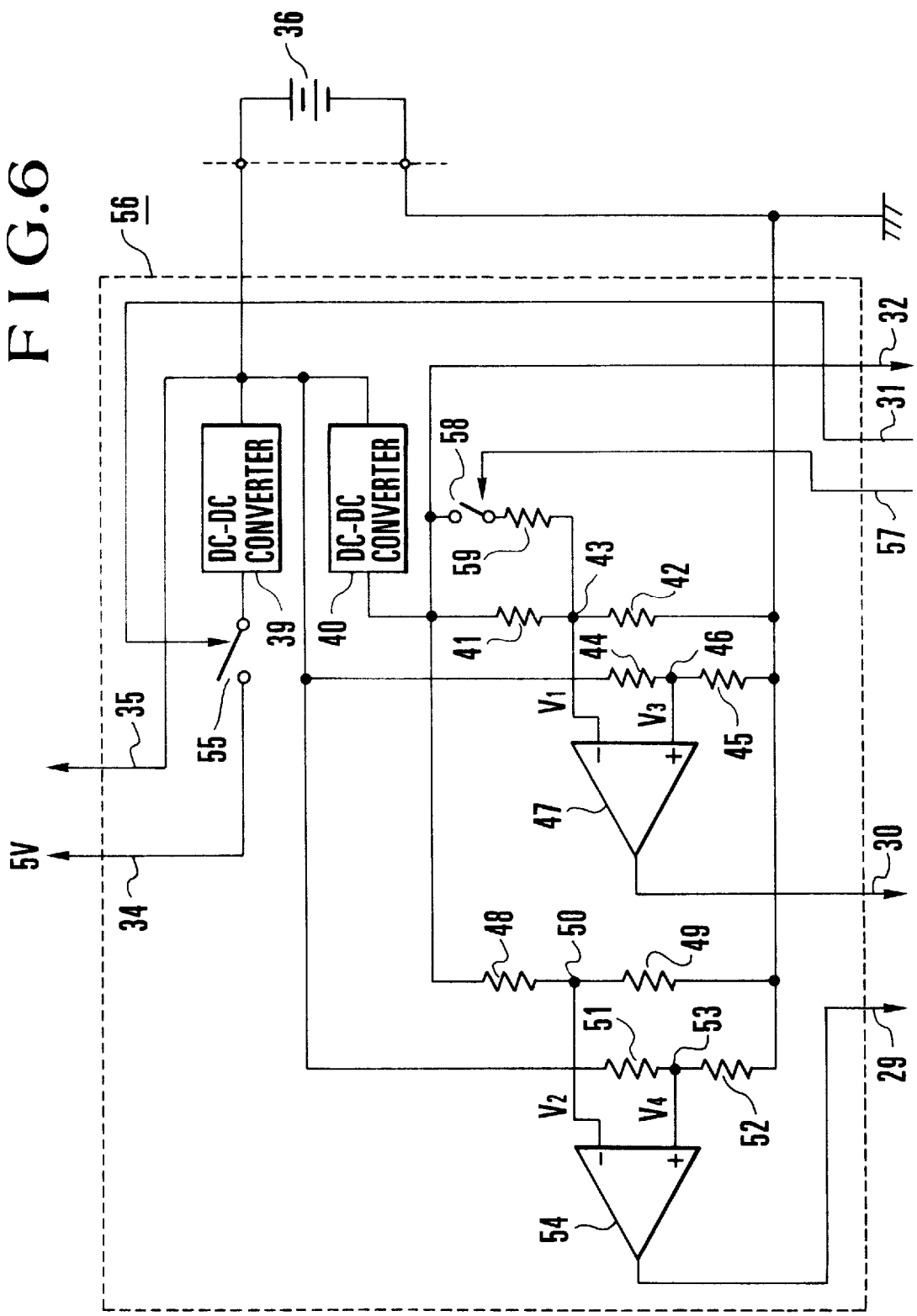
FIG. 6 is a circuit diagram showing in detail a power supply circuit arranged according to this invention.

FIG. 6 is a circuit diagram showing in detail the arrangement of the power supply circuit 56 which is arranged according to this invention. In FIG. 6, the same parts as those shown in FIG. 2 are indicated by the same reference numerals and the details of them are omitted from the following description to avoid duplication.

As shown in FIG. 6, a switch 58 and a resistor 59 which are connected in series are inserted in between a connection node 43 of a voltage dividing circuit and the output terminal of the DC—DC converter 40. The switch 58 is arranged to be turned on and off by a signal coming from the control unit 21 via a line 57. The resistance value of the resistor 59 is arranged to be set at such a value that a sufficient amount of power can be supplied while adjustment of a visual line function is in process on the basis of a length of time normally required for the visual line function adjustment, an amount of power to be consumed by the video camera during the visual line function adjustment and a curve indicating an amount of power decrease taking place in the battery 36 with the lapse of time.

Figure 7:
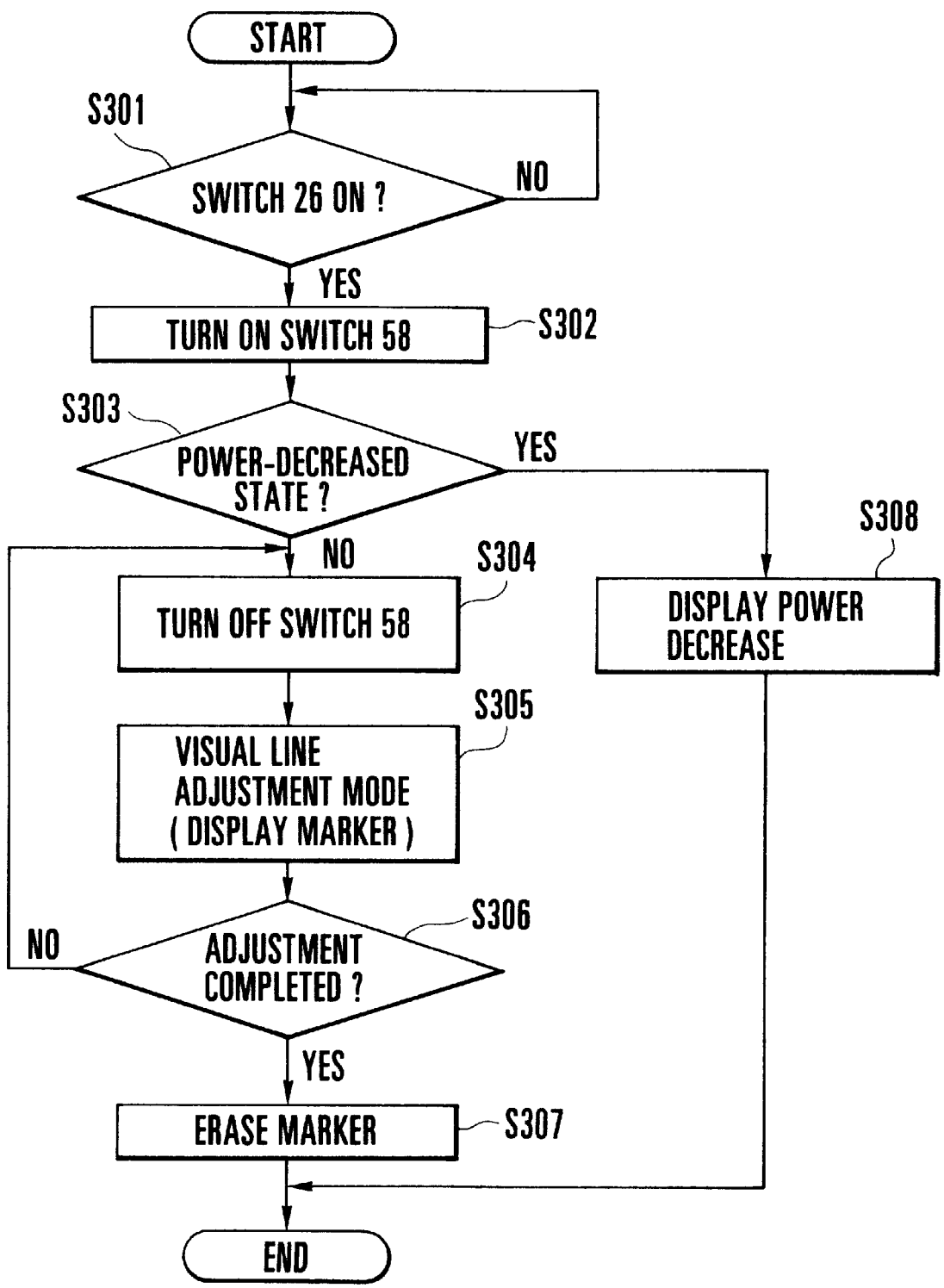
FIG. 7 is a flow chart showing by way of example processes executed by the embodiment of this invention.
Figure 8:
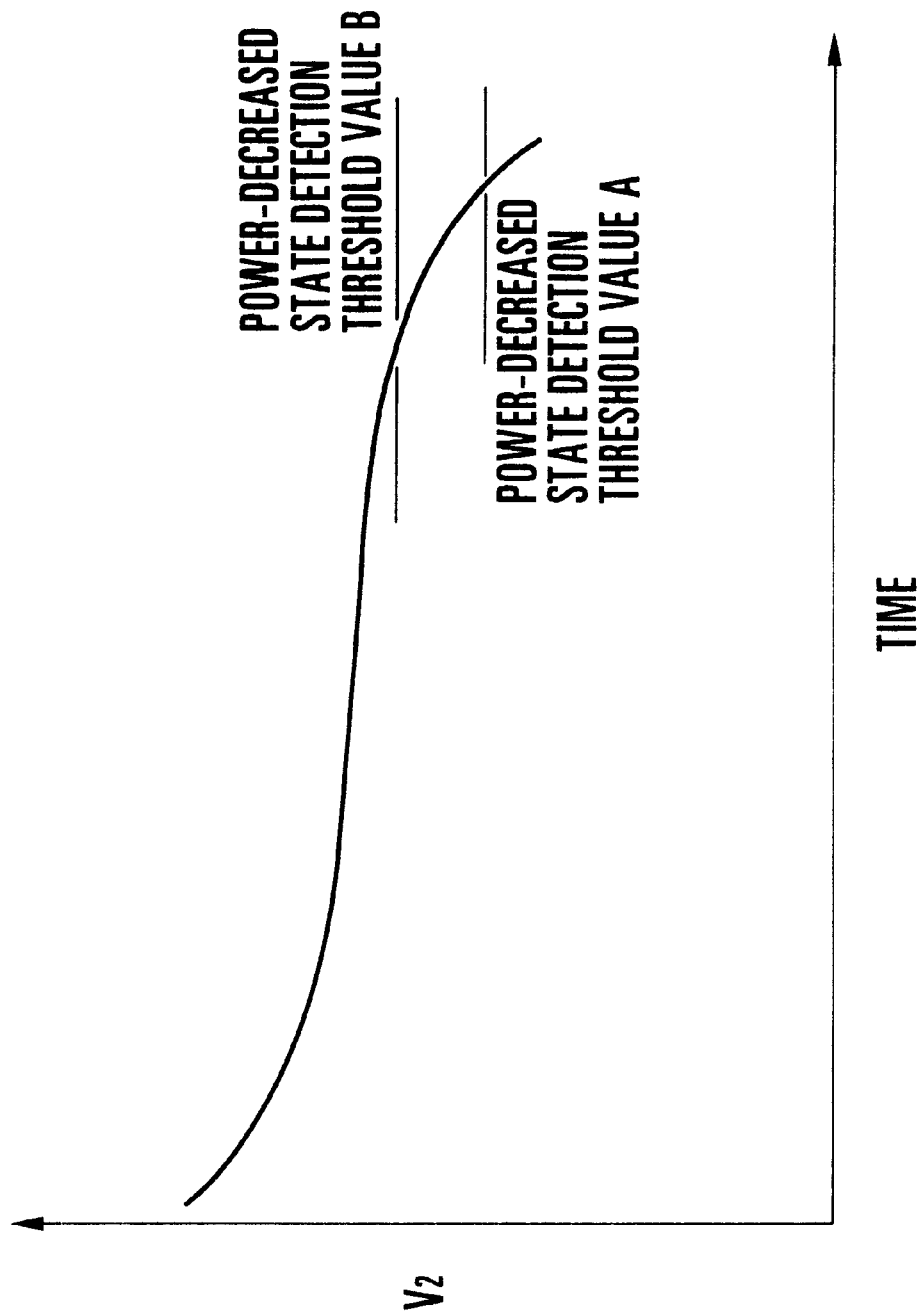
FIG. 8 is a graph showing a decrease in power.

FIG. 7 is a flow chart showing processes to be executed by the control unit 21 according to this invention. After the start of a flow of operation, the flow does not shift to the mode of visual function adjustment until the switch 26 is closed for setting the mode of visual-line function personal error adjustment. The flow thus continues to be in a standby state before the switch 26 is closed. When the switch 26 is found to be closed at a step S301, the flow comes to a step S302. At the step S302, the operator is supposed to be ready for adjustment of the visual line function. The control unit 21 causes the switch 58 to turn on through the line 57. With the switch 58 turned on, the reference voltage V1 of the comparator 47 rises by as much as an amount corresponding to the insertion of the resistor 59 in parallel to the resistor 41. As shown in FIG. 8 which shows the state of discharge of the battery 36 taking place at a predetermined current flow, a normal power-decreased state detection threshold value A is changed to another threshold value B which is to be used at the time of the adjustment. As a result, the threshold value to be used in deciding the power-decreased state is raised. In other words, the power-decreased state can be judged a little early. This process makes a power supply voltage check severer to ensure more reliable adjustment in the visual-line function personal error adjustment mode.

At a step S303, information on the output state of the comparator 47 is taken in, with the switch 58 left in the closed state, and is checked to find if it indicates a power-decreased state, i.e., to find if the output is less than the power-decreased state detection threshold value B. If so, the flow comes to a step S308 to display the power-decreased state. This display urges the operator to replace the battery and to have the visual-line function adjusted once more. If the battery is found to be not in a power-decreased state at the step S303, it is assumed that a sufficient amount of power can be obtained during the visual-line adjustment, because the current power-decreased state detection threshold value is higher than the normal power-decreased state detection threshold value and the battery shows a higher voltage value than the current threshold value. The flow then comes to a step S304. At the step S304, the switch 58 is turned off to bring the power-decreased state detection threshold value back to the normal value and the flow comes to a step S305. At the step S305, the video camera comes to the visual-line function adjustment mode.

Figure 3:
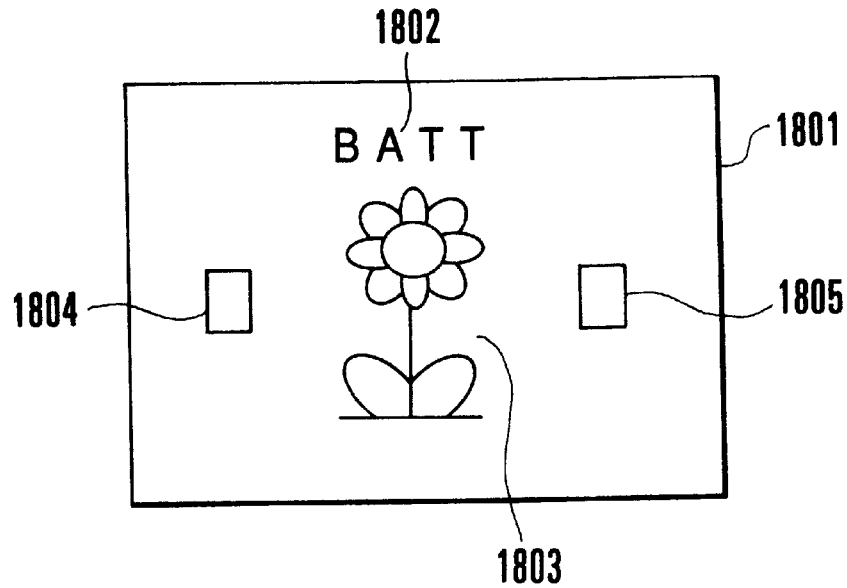
FIG. 3 shows by way of example an image plane on which a power-decreased state is displayed.
Figure 4:
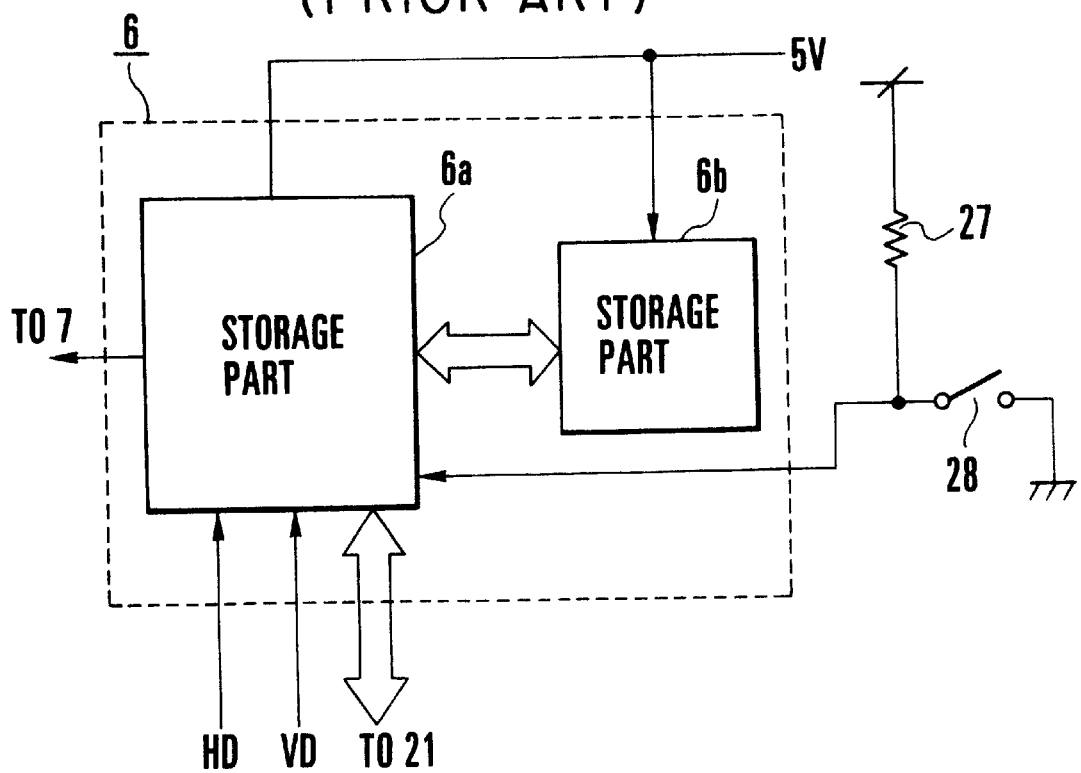
FIG. 4 is a block diagram showing in detail the arrangement of an arithmetic control device.

In the visual-line function adjustment mode, markers 1804 and 1805 for adjustment of visual-line function personal error which are as shown in FIG. 3 are displayed within the viewfinder of the camera to allow the operator to know that the camera has come to the visual-line function adjustment mode. At a step S306, a check is made to find if the visual-line adjustment has been completed. If so, the flow comes to a step S307 to bring the flow to an end by erasing the markers 1804 and 1805 for visual-line function personal error adjustment. Further, if the adjustment is found at the step S306 to have been not completed, the flow comes back to the step S304 to repeat the subsequent steps. Any error or difference between a point at which the operator is actually looking and a visual line of the operator as detected by the apparatus can be corrected by these processes. Information on the error thus obtained is stored as personal error data by the storage part which is arranged within the control unit 21.

Figure 9:
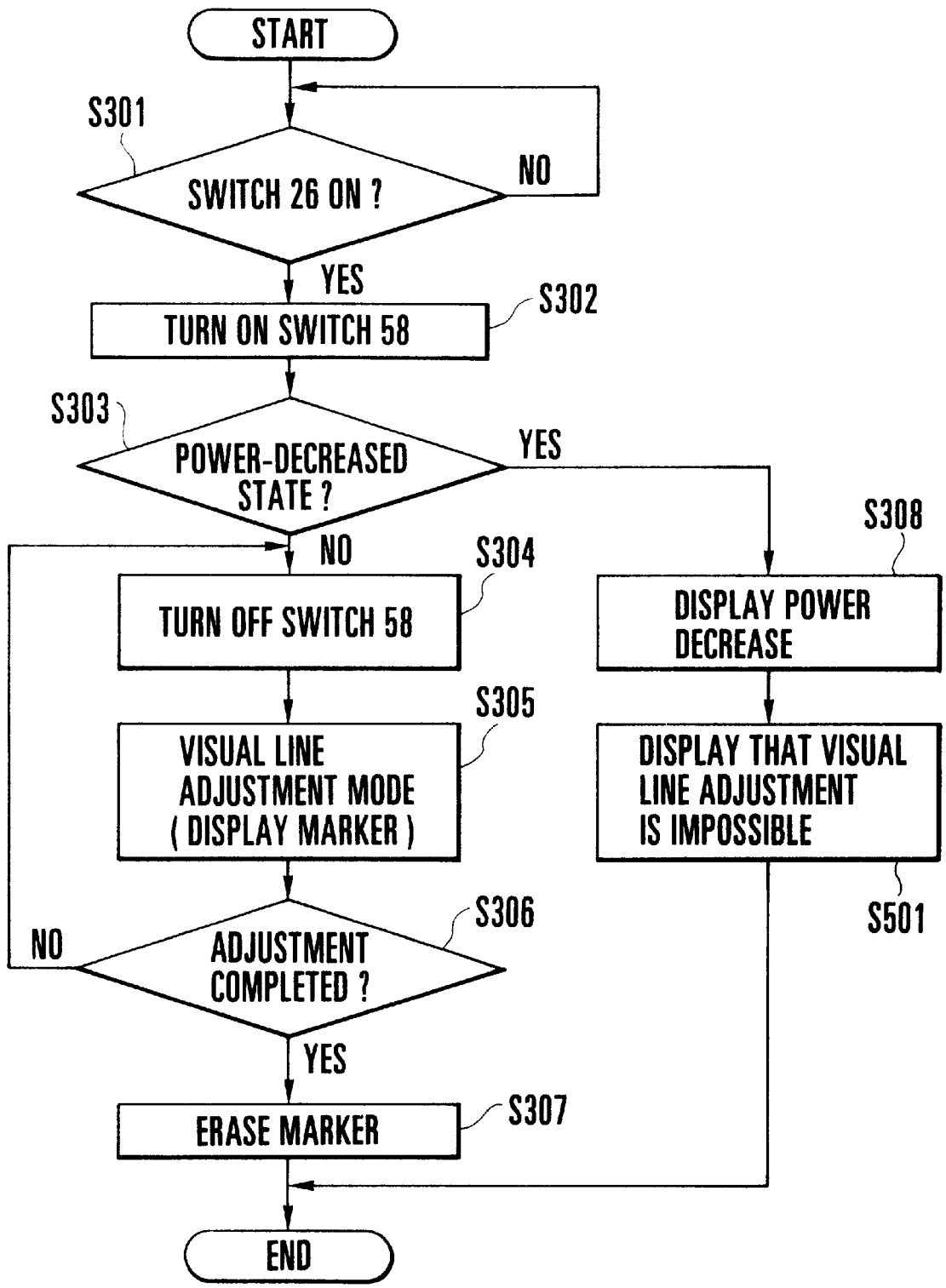
FIG. 9 is a flow chart showing the operation of a second embodiment of this invention.

FIG. 9 is a flow chart showing the operation of a second embodiment of this invention. In FIG. 9, the same processes as those of the flow chart of FIG. 7 are indicated by the same step numbers and these steps are omitted from the following description.

Referring to FIG. 9, if the battery is found at the step S303 to be in a power-decreased state, the flow comes to the step S308 to make a flickering display of the power-decreased state on the image plane of the monitor 9. The display urges the operator to replace the battery and to have the visual line function adjusted once more. After the step S308, the flow comes to a step S501 to make a display which informs the operator that the visual line adjustment is impossible. The flow then comes to an end. Other processes are the same as those shown in FIG. 7.

Figure 10:
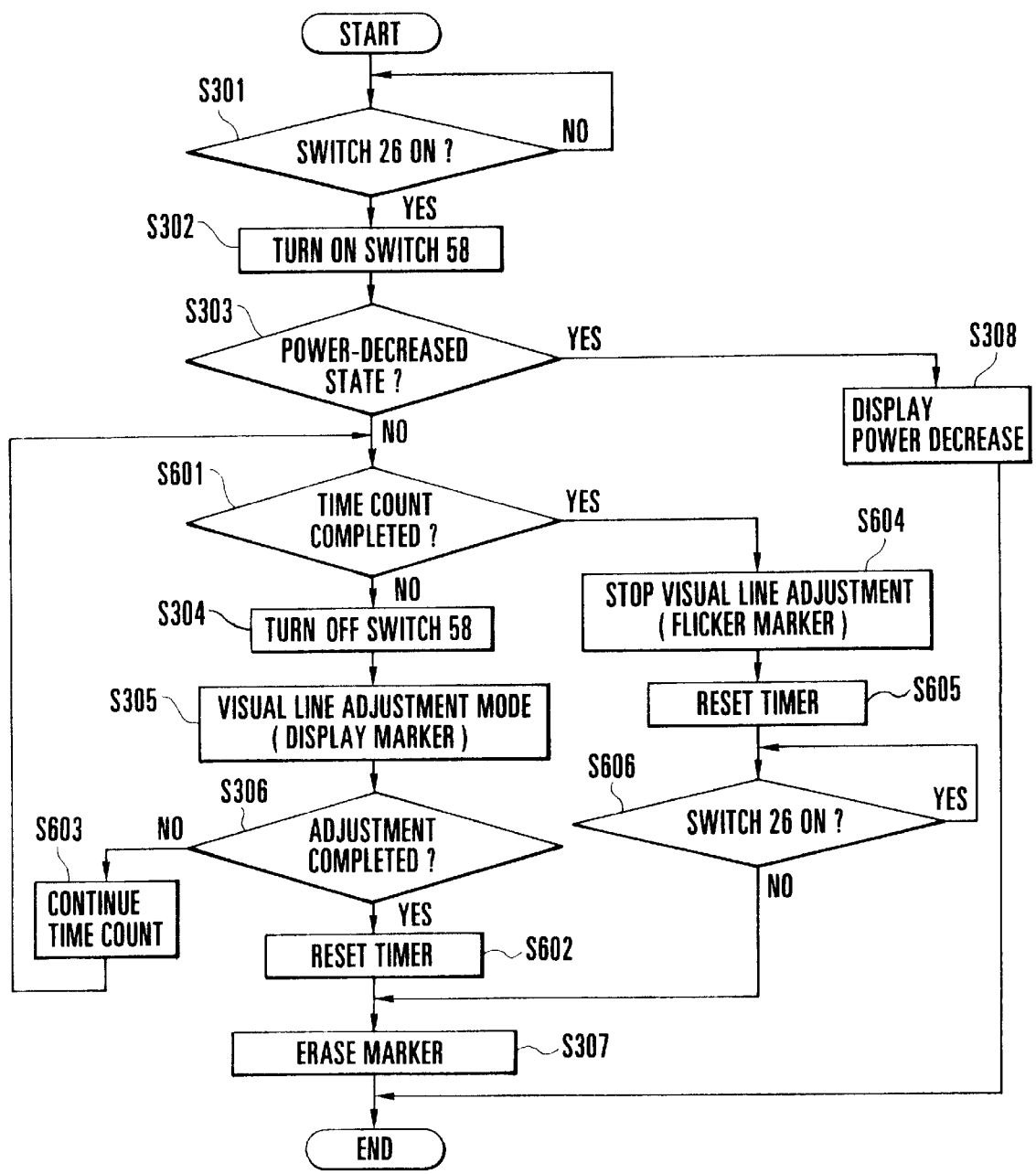
FIG. 10 is a flow chart showing the operation of a third embodiment of this invention.

FIG. 10 is a flow chart showing the operation of a third embodiment of this invention. In FIG. 10, the same processes as those of FIG. 7 are indicated by the same step numbers and these steps are omitted from the following description to avoid duplication. The value of the resistor 59 shown in FIG. 6 is determined by the amount of power decreasing with time of the battery 36 and a length of time normally required for visual line adjustment as shown in FIG. 8. A curve of the decreasing amount of power or energy of the battery 36 and the amount of power to be consumed by the video camera can be found while the video camera is in the stage of being designed. However, as to a length of time required for visual-line adjustment, it involves a personal error of the operator and can be hardly determined in the stage of designing. Meanwhile, in each of the embodiments, if once the power supply is decided to be not in a power-decreased state at the step S303, the process of adjustment would be repeated irrespective of the power-decreased state of the battery 36. In other words, the length of time required for adjustment is decided without considering unevenness existing among individual persons.

It is conceivable to continuously make the check for a power-decreased state while the adjustment is in process and to stop the adjustment when a power-decreased state is found. According to this method, however, if the check is made while the data of personal error of visual line is being written into a storage element, the writing would be carried out in the power-decreased state.

To solve this problem, the third embodiment is arranged to set a limit to the length of time allowable to the visual-line adjustment and to determine the resistance value of the resistor 59 according to the limited length of time. This arrangement enables the embodiment to protect the contents of the storage element by removing any uncertainty which existed in the stage of designing.

If the power supply is found to be not in any power-decreased state at the step S303, the flow comes to a step S601 to find if the count value of a timer set has reached a predetermined value. If not, the flow comes to the step S304 to turn off the switch 58. At the step S305, the monitor 9 is caused to display the visual-line function personal-error adjusting markers 1804 and 1805 and the visual-line function personal error is adjusted. At the step S306, a check is made to find if the visual-line adjustment has been completed. If so, the flow comes to a step S602. At the step S602, the timer is reset. The personal error data is stored in a storage element disposed within the control unit 21. At the step-S307, the visual-line function personal-error adjusting markers 1804 and 1805 are erased from the display. Further, if the visual-line adjustment is found to be not completed at the step S306, the flow comes to a step S603 to continue the time count. After that, the flow comes back to the step S601 to repeat execution of subsequent processes.

If the time count is found to have been completed at the step S601 on the other hand, the flow comes to a step S604 to bring the visual-line adjustment to a stop. At a step S605, the timer is reset. At a step S606, a check is made to find if the switch 26 is in an on-state. If not, the flow comes to the step S307 to erase the visual-line function personal-error adjusting markers 1804 and 1805.

According to the arrangement of the third embodiment described, the duration time of the adjustment mode is limited, so that the value of the resistor 59 can be determined according to this limited time. Compared with other embodiment, the third embodiment more reliably protects the contents of the storage element.

Figure 11:
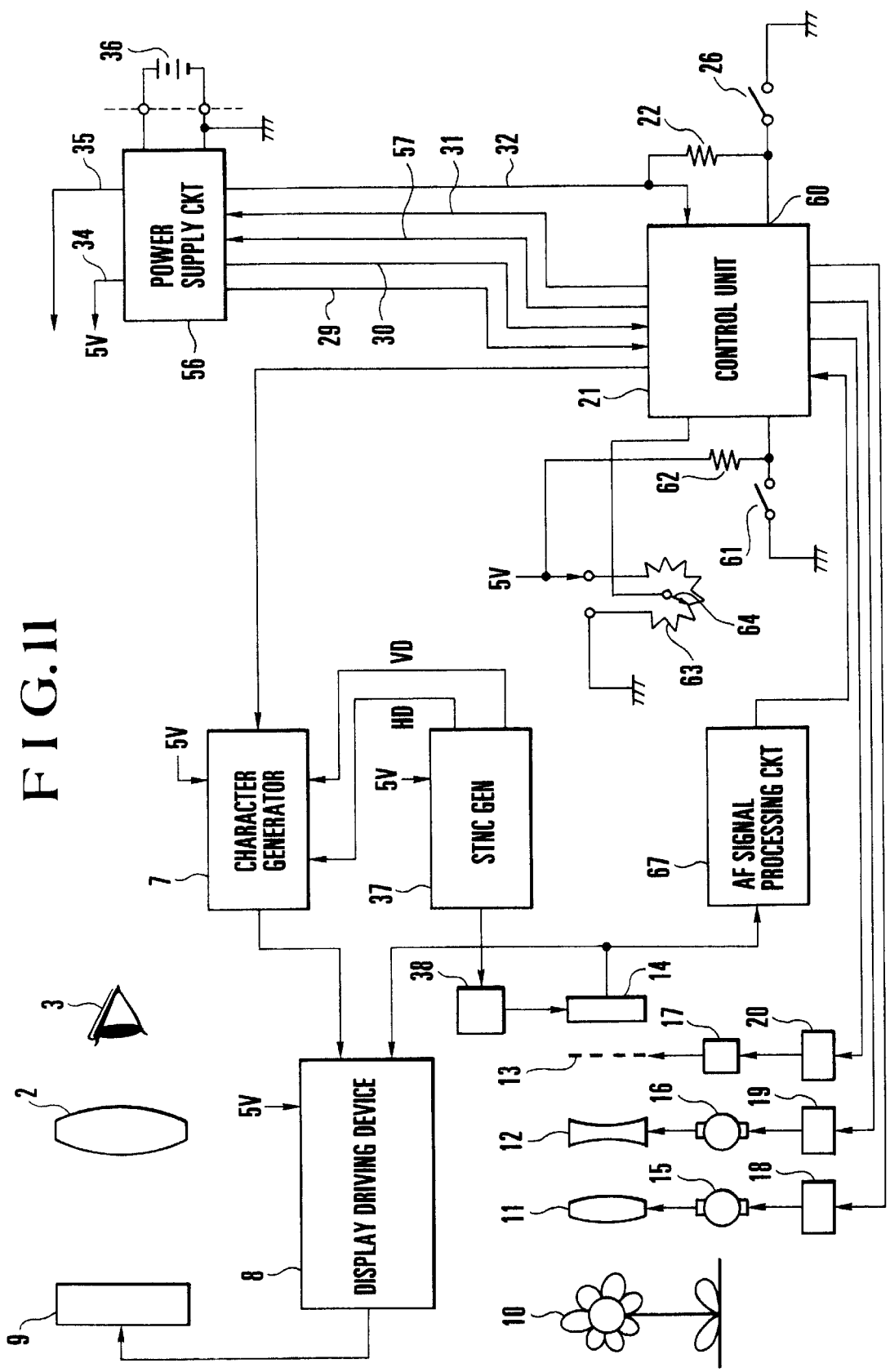
FIG. 11 is a block diagram showing the arrangement of a fourth embodiment of this invention.

FIG. 11 is a block diagram showing a fourth embodiment of this invention. In FIG. 11, the same parts as those of FIG. 5 are indicated by the same reference numerals and all the details of them are omitted from the following description to avoid duplication.

The fourth embodiment is characterized in that the part related to the visual-line adjustment is removed while a title selecting function is added to the control unit 21. The word "title" as used here means something like a part 805 shown in FIG. 12. The title 805 is arranged to be stored by superimposing characters (or letters) 803, etc., on the image of an object of shooting 802 obtained within a image plane 801.

Referring to FIG. 11, when a switch 26 which is connected to the control unit 21 is closed, the level of voltage obtained at an input terminal 60 becomes low to actuate the title selecting function of the control unit 21. Deciding characters and selection of the characters located in different positions are made by using a switch 61. The switch 61 is operated by setting the voltage of a 5 V line supplied via a resistor 62 either at 0 potential or at 5 V.

Figure 12:
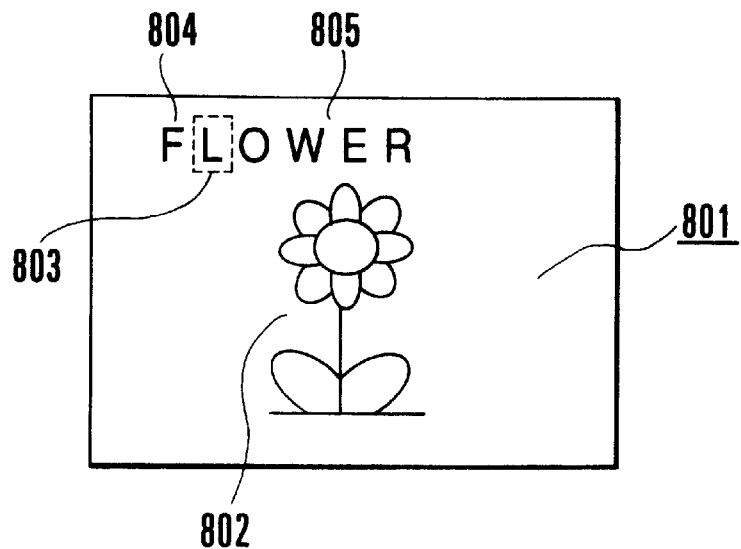
FIG. 12 shows by way of example an image plane on which a display is made according to this invention.

With the switch 26 turned on (closed), "F" which is the first character (or letter) 804 as shown in FIG. 12 flickers. When the rotary shaft of a variable resistor 63 is turned, the potential of a variable terminal 64 changes according to the turn. Then, the character "F" on display can be varied according to the change in the potential, for example, in alphabetical order F-G-H-I-J.

If it is desired to leave the "F" as it is and to vary another character "L" 803, the switch 61 is opened and closed once without turning the rotary shaft of the variable resistor 63 from its position for the flickering "F". This causes the flickering position on display to shift to the character 803. Then, "F" is stored in a storage element as it is. When the rotary shaft of the variable resistor 63 is turned from its position for the character 803 to select any other desired character and the switch 61 is closed once, the character thus selected is stored in the storage element. The flickering state then shifts to a next character. Upon completion of selection of characters, the embodiment can be brought back to a normal operating state by opening the switch 26.

Figure 13:
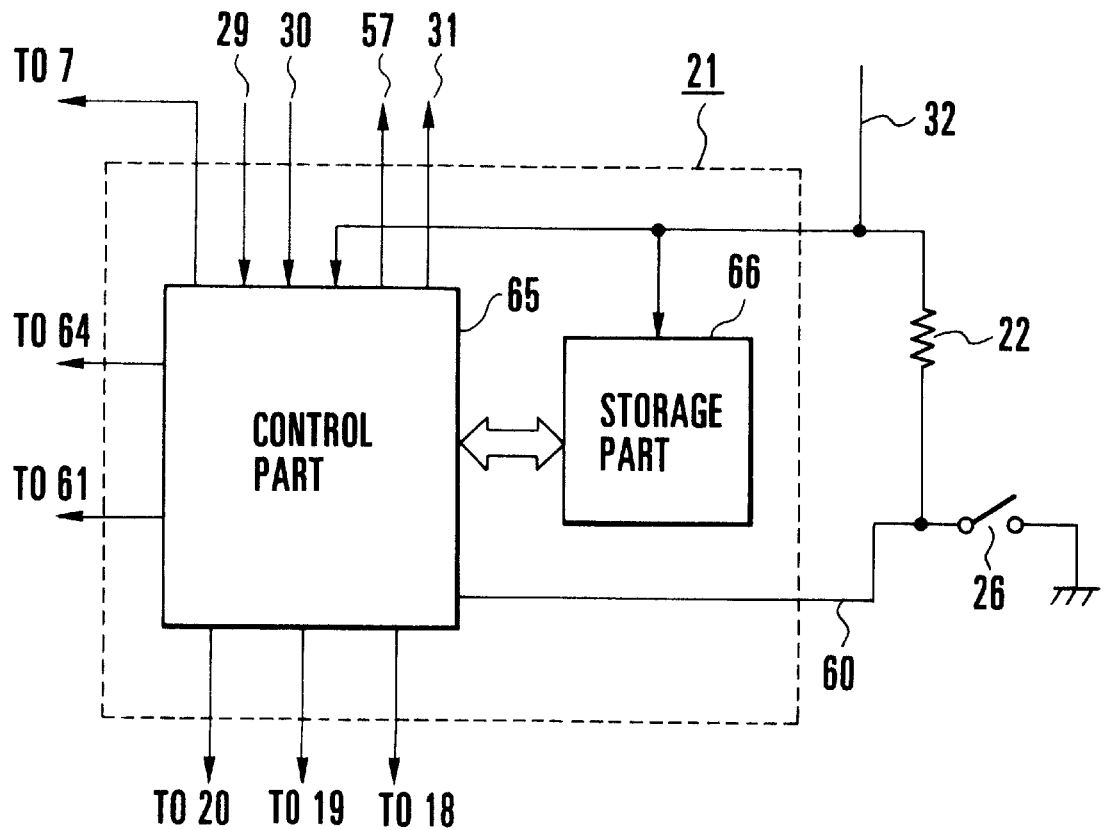
FIG. 13 is a block diagram showing in detail a part of the electronic apparatus.

FIG. 13 is a circuit diagram showing in detail the arrangement of the storage element of the control unit 21. Referring to FIG. 13, the control unit 21 consists of a control part 65 and a storage part 66. The storage part 66 includes a storing medium such as an EEPROM or the like. The EEPROM permits erasing and writing only by a special process. Therefore, if a power-decreased state takes place during the special process, the power decrease might trigger a serious malfunction. Then, since the control unit 21 uses a power source which is not shut off by the switch 55 of the power supply circuit 56, the control unit 21 tends to act even at a low power supply voltage. However, the control part 65 and the storage part 66 of the control unit 21 must be operated by using a power source which sufficiently meets necessary conditions required as a power source. If not, the probability of malfunction is very high. Hence, the arrangement of performing a rewriting action on the storage element while continuously monitoring the state of the power supply is highly significant.

Figure 14:
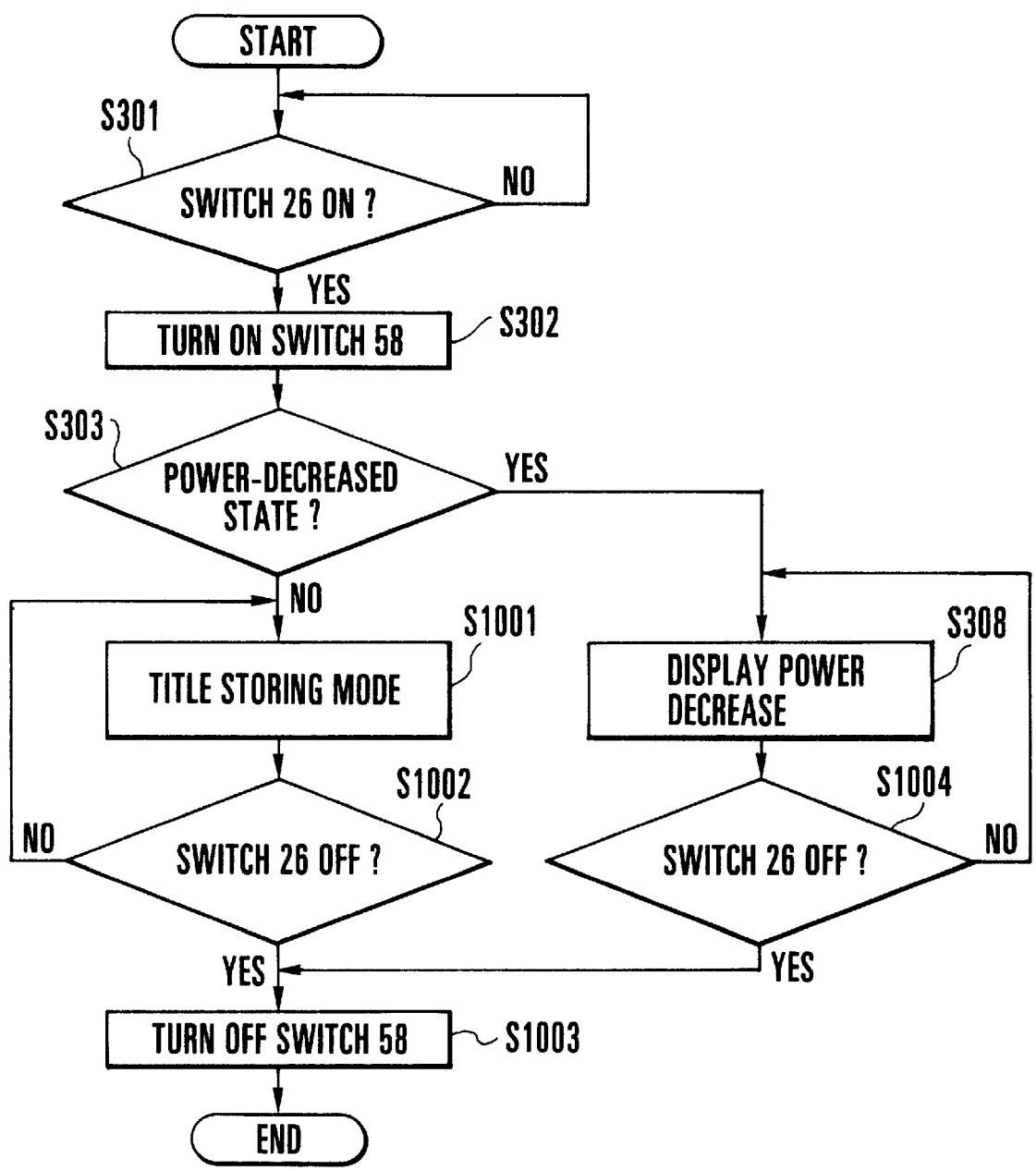
FIG. 14 is a flow chart showing the processes of a storage element protection program applicable to a case where a character title is to be stored.

FIG. 14 is a flow chart showing the processes of a storage element protection program to be used in storing a character title. In FIG. 14, the same processes as those of each flow chart described in the foregoing are indicated by the same step numbers and reference numerals.

Referring to FIG. 14, a check is made at the step S301 to find if the switch 26 has been closed (turned on). If so, the operator is supposed to have no intention of changing the character title and the flow of operation remains in a standby state. If the switch 26 is found to have been turned on, the flow comes to the step S302 to raise the power-decreased state evaluation (detection) threshold value by closing the switch 58. At the step S303, a check is made for a power-decreased state. If a power-decreased state is decided under the condition of using the higher threshold value, the flow comes to the step S308 to make a display of the power decrease until the switch 26 is found to have been turned off at a step S1004. No character title is selected and stored.

If the power supply is found to be not in a power-decreased state at the step S303, the flow comes to a step S1001. At the step S1001, a title storing mode is set. A character title is selected and stored. At a step S1002, a check is made to find if the switch 26 has been turned off. If so, the flow comes to a step S1003 to turn off the switch 58 and the flow thus comes to an end. In a case where the switch 26 is found to be in an on-state at the step S1002, the flow comes back to the step S1001 to repeat the subsequent processes because, in that case, the title selecting and storing action might be carried on.

Figure 15:
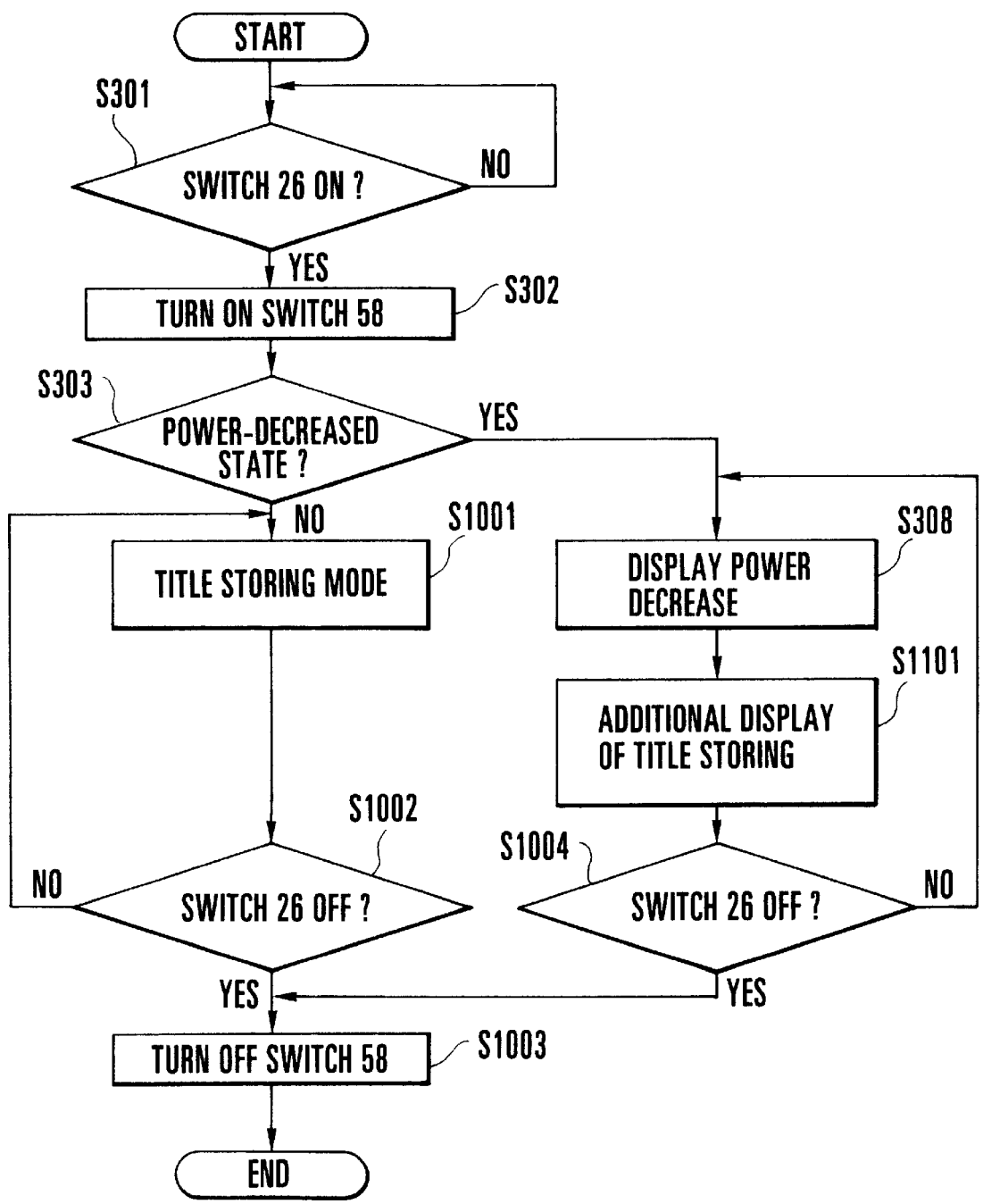
FIG. 15 is a flow chart showing the processes of an example of modification of what is shown in FIG. 14.

FIG. 15 is a flow chart showing one example of modification of the processes of FIG. 14. In the case of this modification example, a step S1101 of making an additional display of storing a title is provided between the steps S308 and S1004 of the flow chart of FIG. 14. After the decrease of power is displayed by the step S308, the flow comes to the step S1101. At the step S1101, either all the characters 804 shown in FIG. 14 are caused to flicker or, if there is no character stored as a title, suitable characters are outputted.

Figure 16:
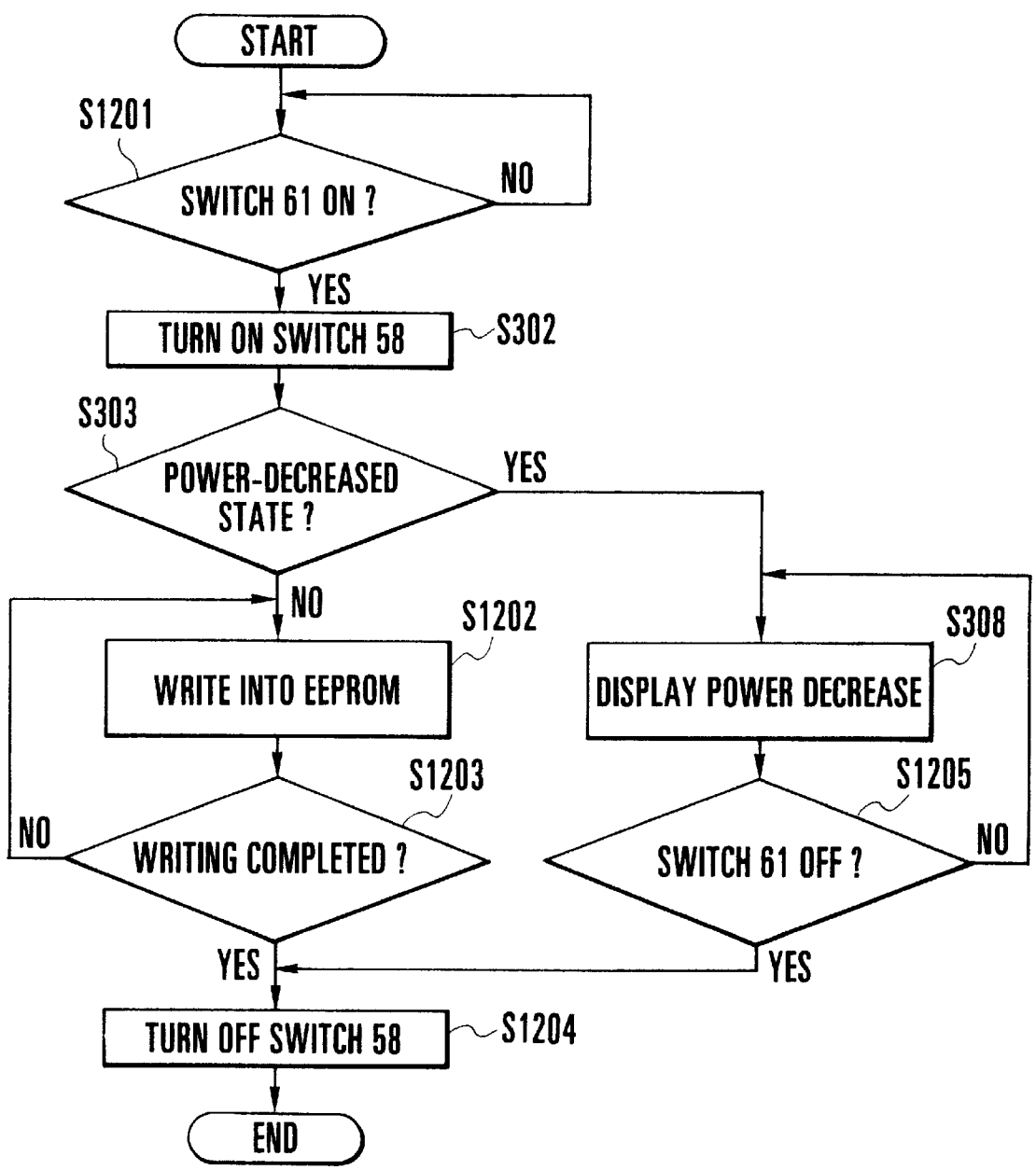
FIG. 16 is a flow chart showing the operation of a fifth embodiment of this invention.

FIG. 16 is a flow chart showing the operation of a fifth embodiment of this invention. The arrangement of the fifth embodiment is the same as the arrangement shown in FIG. 11. In the flow chart of FIG. 16, the same processes as those of each of the flow charts which have been used in the foregoing description are indicated by the same step numbers and reference numerals.

Referring to FIG. 16, a check is made at a step S1201 to find if the switch 61 which is arranged to be used in outputting an instruction for storing characters is closed. If not, the flow of operation remains in a standby state, because there is no fear of destruction of the contents of storage even if a power-decreased state takes place in the power supply.

When the switch 61 is found to have been turned on at the step S1201, the flow comes to the step S302. At the step S302, the switch 58 is turned on to raise the power-decreased state evaluation (detection) threshold value. At the step S303, the voltage of the battery 36 is evaluated on the basis of the higher power-decreased state evaluation threshold value. If the battery 36 is found not in a power-decreased state, the flow comes to a step S1202. At the step S1202, the kind of characters designated is stored in the storage part 66 (FIG. 13). At a step S1203, a check is made to find if this storing (writing) action has been completed. If not, the flow comes back to the step S1202 to carry on the storing (writing) action.

If the writing action is found at the step S1203 to have been completed, the flow comes to a step S1204. At the step S1204, the switch 58 is turned off to bring the flow of operation to an end. On the other hand, if a power-decreased state is found by the step S303, the flow comes to the step S308 to display the power decrease until the switch 61 is turned off. With the switch 61 found to be in an off-state at the step S1205, the flow comes to the step S1204 to turn off the switch 58.

Figure 17:
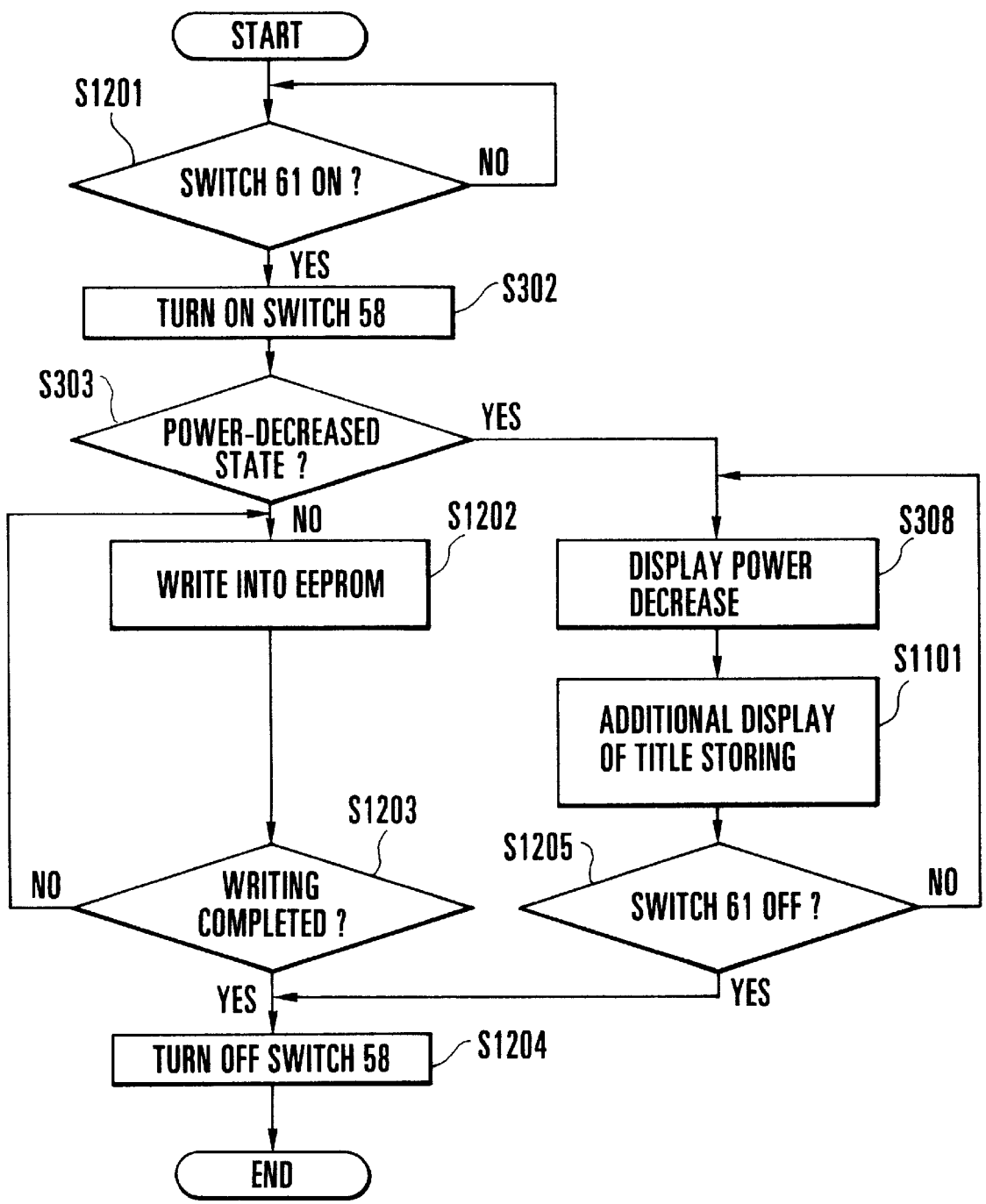
FIG. 17 is a flow chart showing the processes of an example of modification of what is shown in FIG. 16.

FIG. 17 is a flow chart showing one example of modification of the fifth embodiment which has been described above with reference to FIG. 16. In FIG. 17, the same processes as those of the flow charts of other embodiments described in the foregoing are indicated by the same step numbers and reference numerals and the details of them are omitted from the following description to avoid duplication.

In the case of this modification, the fifth embodiment is arranged to execute a step S1101 of making an additional display of storing a title. The step S1101 is inserted in between the steps S308 and S1205 of the flow chart of FIG. 16. The process for making the additional display of storing a title is identical with the corresponding part of the description given in the foregoing with reference to FIG. 15 and, therefore, requires no further description thereof.

Figure 18:
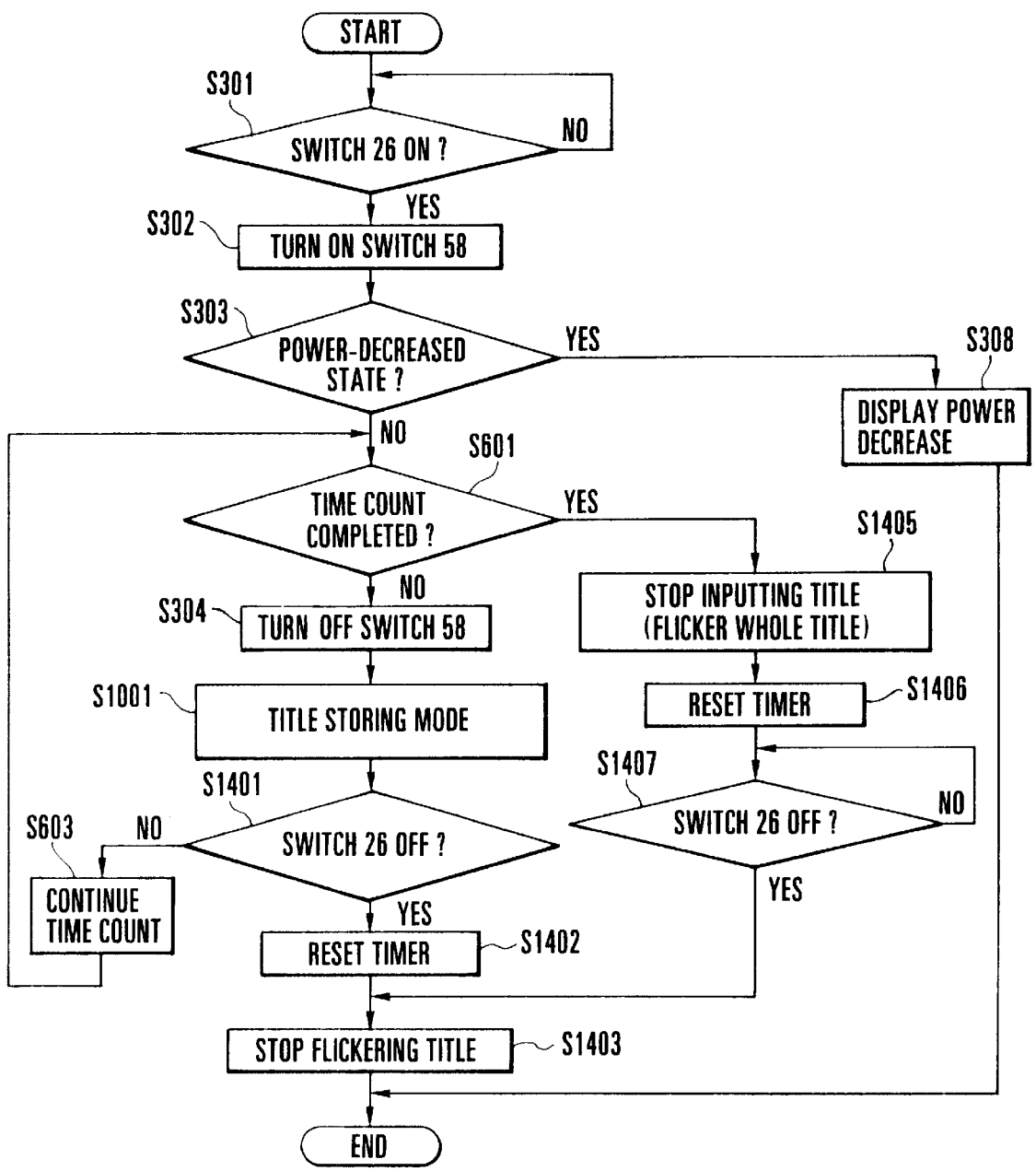
FIG. 18 is a flow chart showing the operation of a sixth embodiment of this invention.

FIG. 18 is a flow chart showing the operation of a sixth embodiment of this invention. In FIG. 18, the same processes as those of other embodiments described in the foregoing with reference to other flow charts are indicated by the same step numbers and reference numerals.

In the case of the sixth embodiment, the functions of the fourth and fifth embodiments are supplemented with another function which is obtained by making some addition to the function shown in FIG. 14.

In each of the fourth and fifth embodiments, if the battery 36 is once judged to be not in a power-decreased state at the step S303, a character input action is repeated irrespective as to whether or not the battery 36 comes into a power-decreased state thereafter. In other words, the operation is performed without paying any heed to unevenness in length of time required in inputting characters among individual operators. This problem may be considered to be solvable by continuously making checks for a power-decreased state while the character input action is in process and to bring the input action to a stop when a power-decreased state is found. However, if this state takes place when writing into the storage element is in process, it become impossible to stop writing while the battery 36 is in a power-decreased state. Under such a condition, data might be incorrectly written into the storage element.

To solve this problem, the sixth embodiment is arranged to set a limit to the length of time allowable for inputting characters on the same concept as the second embodiment. The uncertainty existed in the stage of designing is removed by deciding the value of the resistor 59 (FIG. 6) according to the limited time. This arrangement enables the sixth embodiment to more reliably protect the contents of the storage element.

The details of the flow of processes of FIG. 18 are described as follows. With the switch 26 found to have been turned on at the step S301, the flow remains in a standby state until the operator instructs the video camera to shift to a character input mode. When the video camera shifts to the character input mode, the switch 58 is turned on at the step S302. At a step S303, a check is made to find if the battery 36 is in a power-decreased state. If so, the flow comes to the step S308 to have the power decrease displayed.

If the battery 36 is found to be not in a power-decreased state at the step S303, the flow comes to a step S601. At the step S601, a check is made to find if a count value of a timer specially set has reached a predetermined value. If not, the flow comes to the step S304 to turn off the switch 58. At a next step S1001, the video camera is shifted to a title storing mode to allow characters to be inputted. In this instance, only some of the characters that are being changed by turning round the variable resistor 63 alone flicker.

At a step S1401, a check is made to find if the switch 26 is in an on-state. If so, the flow comes to a step S603 to increment the count value of the timer and the flow comes back to the step S601 to repeat the subsequent steps. If the switch 26 is found to be in its off-state at the step S1401, the flow comes to a step S1402 to reset the timer, with the operator supposed to have finished the character input operation. After that, the flow comes to a step S1403 to bring the flickering of the title to a stop.

If the time count by the timer is found to have been completed at the step S601, the flow comes to a step S1405. At the step S1405, a display is made to show that the character (title) input process will come to a stop due to expiration of the time limit. For example, this display is made by causing all the characters of the title to flicker for a period of several seconds. The flow then comes to a step S1406 to reset the timer. At a step S1407, the switch 26 is checked for its state. If the switch 26 is found to be in its off-state, the flow comes to the step S1403.

The reason for the provision of the step S1407 is as follows. If it happens that the processes of the step S301 and the subsequent steps are executed again even after completion of all the processes, the video camera might come to take the character input action. Such a trouble can be prevented by inserting the step S1407.

With the processes arranged in the manner as described above, the length of time allowable for the character input mode is effectively limited. Therefore, the resistance value of the resistor 59 can be set in accordance with this length of time. The sixth embodiment is thus arranged to be capable of more reliably protecting the contents of the storage element while adopting the concepts of the fourth and fifth embodiments.

Figure 19:
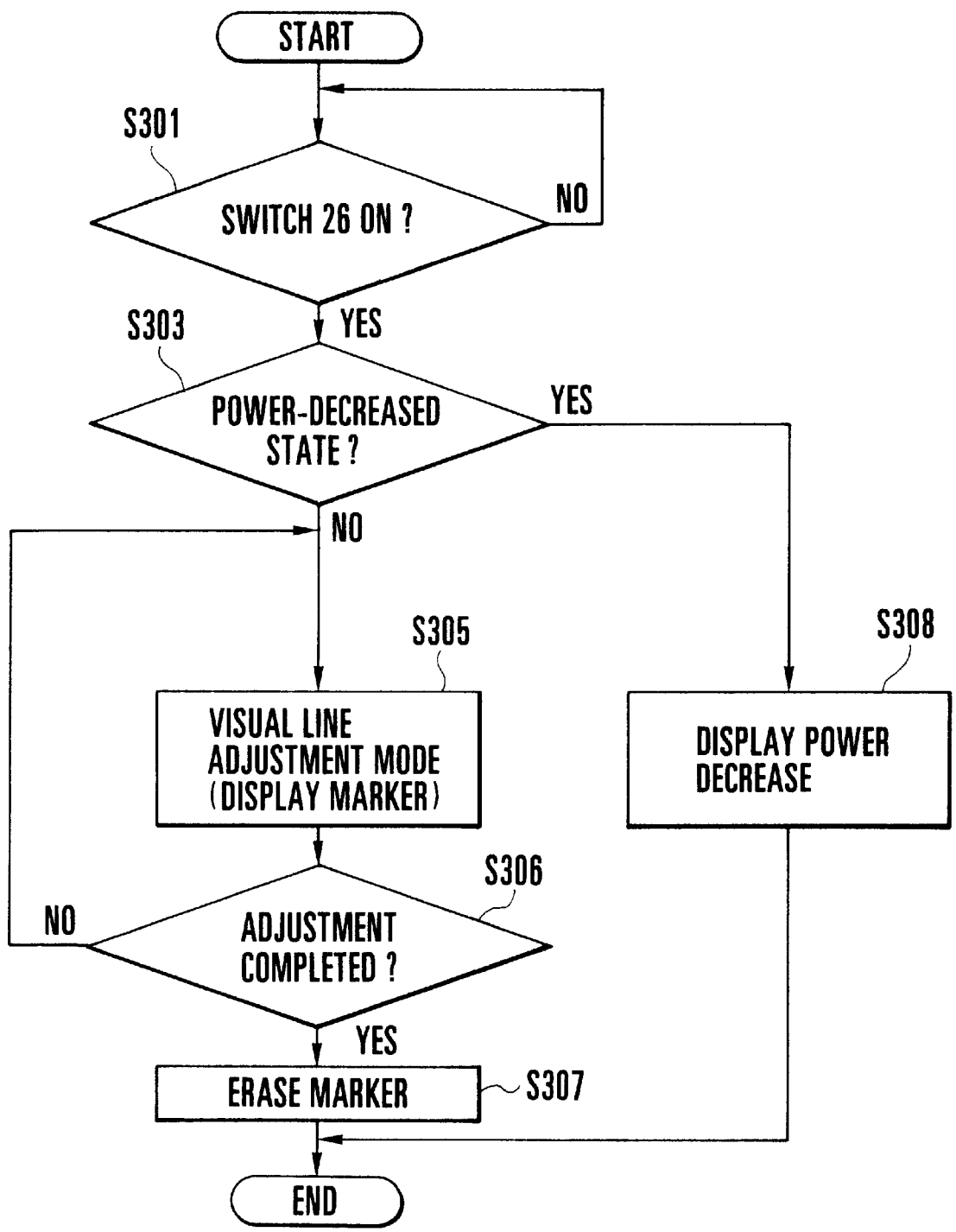
FIG. 19 is a flow chart showing the operation of a seventh embodiment of this invention.

FIG. 19 is a flow chart showing the operation of a seventh embodiment of this invention. The seventh embodiment is a modification of what is shown in FIG. 7. The concept of the seventh embodiment is applicable in common to each of other embodiments.

In the case of FIG. 19, the power-decreased state detection threshold value is left at the power-decreased state detection threshold value A of FIG. 8 without changing it. When the switch 26 is found to have been turned on at the step S301, the flow comes to the step S303 to make a check for a power-decreased state. In this case, the power-decreased state detection threshold value is arranged to be determined by the resistors 41 and 42 of FIG. 6. Even in the adjustment mode, no particular threshold value is set. If the battery 36 is found to be in a power-decreased state, the flow just comes to the step S308 to display the decrease of power and makes no visual-line adjustment.

If the battery 36 is found to be in a power-decreased state at the step S303, the flow comes to the step S305 to shift the video camera to the visual-line adjusting mode and the visual-line adjustment is carried out. When the visual-line adjustment is found to have been completed at the step S306, the flow comes to the step S307 to have the visual-line function personal-error adjusting markers 1804 and 1805 erased from the display and to bring the flow of operation to an end.

With the seventh embodiment arranged to execute the processes as shown in the flow chart of FIG. 19, the contents of the storage element can be protected while the hardware arrangement of the embodiment is left unchanged from the conventional arrangement.

Further, in a case where the control unit is arranged to include a timer and where the on/off operation of the switch 58 is omitted as shown in FIG. 19, the values of the resistors 41 and 42 can be decided to ensure more reliable protection of the storage element by setting the upper limit of the count value of the timer at a smaller value than in the cases of FIGS. 10 and 18.

With the embodiment arranged as described above, the following advantageous effects can be attained:

Since the embodiment includes, in combination, storing means for storing information on a controlled target, storage control means for rewriting the information stored in the storage means or for adding different information to the information stored in the storage means, power-decreased state detecting means for detecting an output state of a power source battery, and control means for making a selection between execution and nonexecution of the storage means and the storage control means on the basis of the detection made by the power-decreased state detecting means. Therefore, the contents of storage can be prevented from being destroyed or ruined by a power-decreased state of the power supply battery.

Since the embodiment is provided with means for informing the operator of the execution or nonexecution of actions to allow the operator to know the current state of operation of the apparatus, the operability of the apparatus can be enhanced.

Since the control means of the embodiment is arranged such that, in operating the storage means and the storage control means, a limit is set to the length of time of their actual operation, a battery capacity at which a power-decreased state never takes place during the operation can be known beforehand. If the state of power supply is such that a power-decreased state might take place while the operation is still in process, the execution of the operation is inhibited, so that the contents of the storage can be more reliably protected.

In the embodiment described, since the power-decreased state detecting means is arranged to have its conditions of detection variable in such a way as to have some allowance before occurrence of a real (critical) power-decreased state, the contents of the storage can be more reliably prevented from being destroyed.

Further, in the embodiment described, since the power-decreased state detecting means is arranged such that its conditions of detection are variable in response to completion or stopping of execution of the action of the storage means or that of the storage control means, the contents of the storage can be reliably prevented from being destroyed and the battery can be used up to the end of its full capacity.

Figure 20:
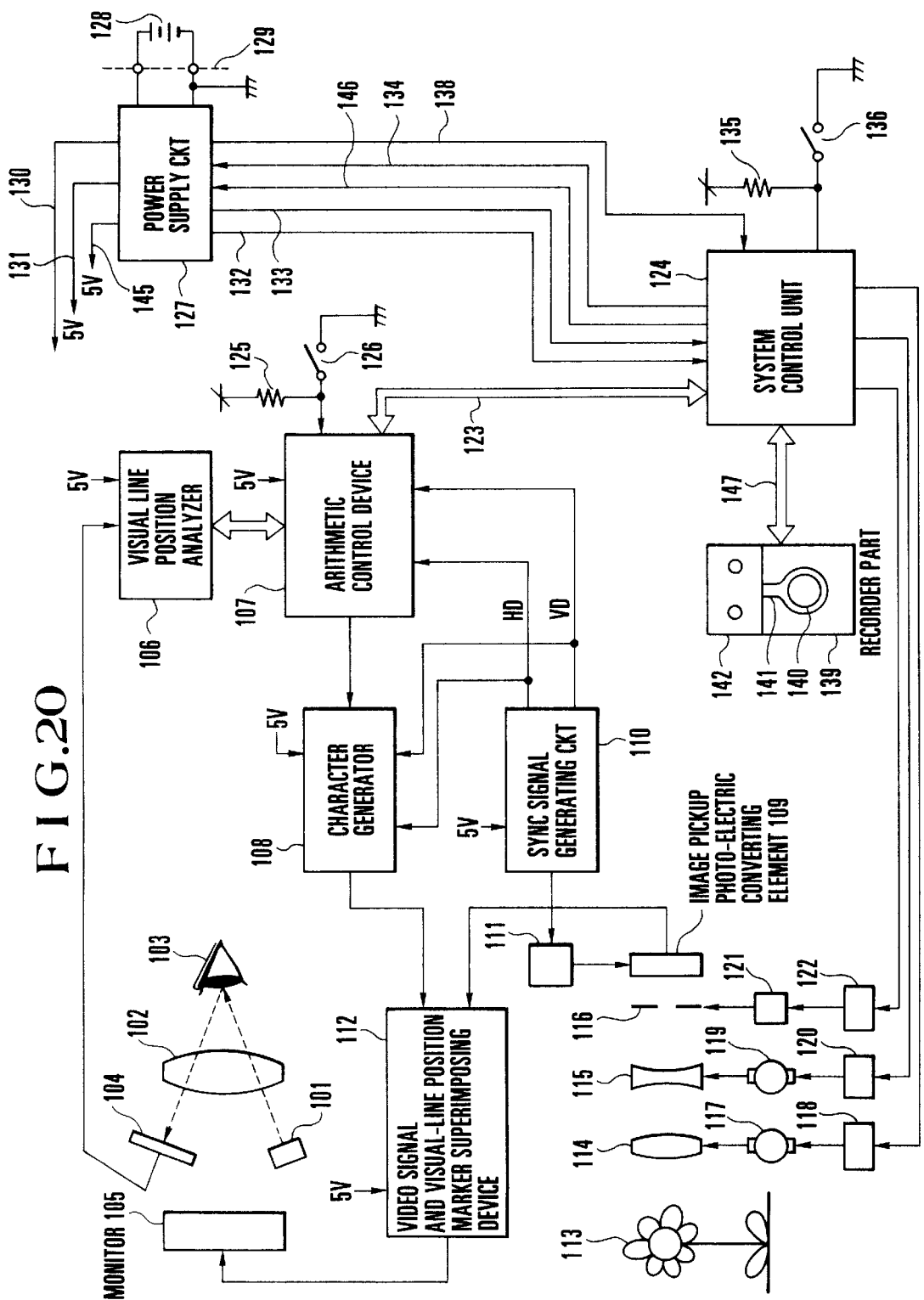
FIG. 20 is a block diagram showing the arrangement of a video camera on which an eighth and subsequent embodiments of this invention are based.

An eighth embodiment of this invention is next described. Before the eighth embodiment, its background is described as follows. FIG. 20 shows the arrangement of a video camera on which the eighth and subsequent embodiments of this invention are based.

Although FIG. 20 includes components parts which are identical with those shown in FIG. 1, all of them are described below again to avoid confusion.

Referring to FIG. 20, the video camera is provided with an infrared ray generating device 101 which is disposed within a viewfinder unit. The eyeball 103 of the operator is illuminated with the infrared light of the infrared ray generating device 101 via an eyepiece 102. A photo-electric converting element 104 is arranged to receive the infrared light of the infrared ray generating device 101 after it is reflected by the eyeball 103 and to convert an optical image thus received into an electrical signal. The electrical signal outputted from the photoelectric converting element 104 is sent to a visual line position analyzer 106. The visual line position analyzer 106 is arranged to analyze and find a part of (the image plane of) a monitor 105 disposed within the viewfinder at which the operator is looking. An arithmetic control device 107 which is composed of a microcomputer, etc., is arranged to receive information on the position of the visual line of the operator which is sent from the visual line position analyzer 106. A character generator 108 which is provided for displaying the visual line position of the operator as recognized by the video camera is arranged to transmit to a video signal and visual-line position marker superimposing device 112 a visual line marker signal, which is obtained on the basis of the information from the visual line position analyzer 106 by computing display coordinates at the arithmetic control device 107. The video signal and visual-line position marker superimposing device 112 is arranged to superimpose visual-line position markers on a video signal and to send them out to show them on the monitor 105 in the viewfinder unit. The video signal inputted to the superimposing device 112 is information on the image of an object 113 which is projected on the (image pickup) photo-electric converting element 109 through an optical system consisting of a focusing lens 114, a variator lens 115, a diaphragm 116, etc. The image pickup photo-electric converting element 109 is arranged to be driven by a driving circuit 111. The driving circuit 111 is arranged to receive from a synchronizing signal generating circuit 110 a signal which indicates the timing of driving. The synchronizing signal generating circuit 110 is arranged to provide the arithmetic control device 107 and the character generator 108 with a vertical synchronizing signal and a horizontal synchronizing signal for confirmation of a display position on the monitor 105.

The elements 114, 115 and 116 of the optical system are arranged to be moved respectively by actuators 117, 119 and 121. The actuators 117, 119 and 121 are arranged to be driven respectively by drivers 118, 120 and 122. A system control unit 124 performs control over the operation of the video system including lens control. A communication line 123 enables the the system control unit 124 and the arithmetic control device 107 to communicate with each other. Reference numeral 125 denotes a pull-up resistor. Reference numeral 126 denotes a switch which is provided for adjustment (calibration) of a personal error existing in a visual line function.

Blocks located around the visual line detecting device are next described as follows. The video camera is provided with a power supply circuit 127. A battery 128 is interchangeable with another battery usable by the video camera and is disposed on a battery mounting part 129. An unregulated line 130 is arranged to supply the output of the battery 128 directly to each necessary part of the video camera. A 5 V line 131 is arranged to supply the output of the battery 128 by converting it into a voltage of 5 V. Another 5 V line 145 is arranged also to supply the voltage of 5 V to each part of a recorder system. Lines 132 and 133 are provided for informing the system control unit 124 of a power-decreased state (a drop of the power supply capability of the battery). A line 134 is provided for control over the supply of power to the 5 V line for the camera system. A line 146 is provided for control over the supply of power to the recorder system. A power supply line 138 is arranged to continuously supply the system control unit 124 with power as long as the battery 128 is mounted. A recorder part 139 includes a recorder control system. The illustration includes also a rotary drum 140 on which a head is mounted, a tape 141 and a tape cassette 142. A communication line 147 connects the recorder part 139 to the system control unit 124.

The internal arrangement of the power supply circuit 127 is described in detail with reference to FIG. 21 as follows: The power supply circuit 127 functions to output the voltage of the battery 128 by converting it into a power supply voltage for integrated circuits used within the video camera (5 V, for example), to supply information on a power-decreased state of the battery 128 to the system control unit 124 and, when an instruction is received through the line 134 from the system control unit 124 for stopping the supply of power, to stop supplying the power to the 5 V line 131.

Figure 21:
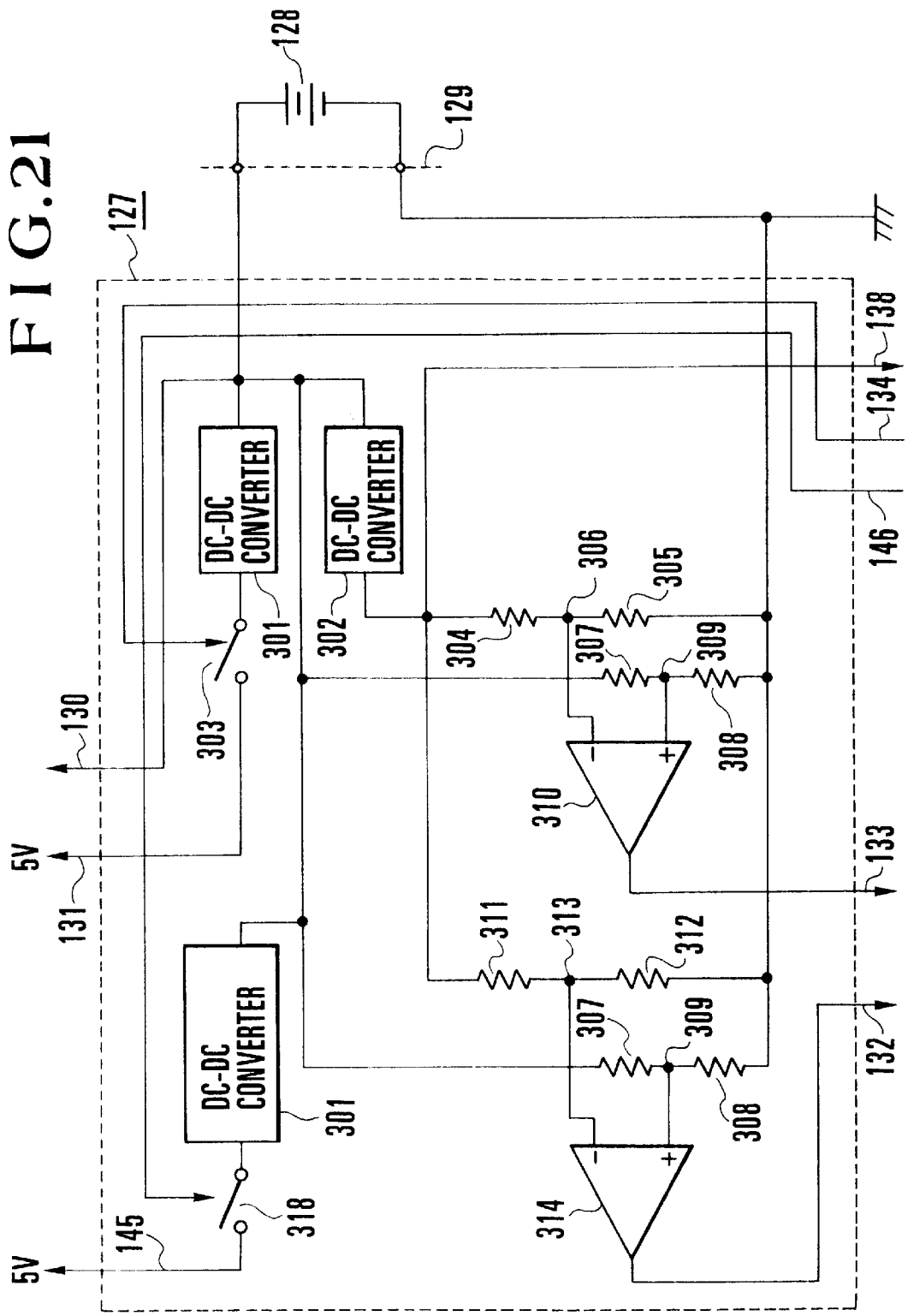
FIG. 21 is a circuit diagram showing the details of a power supply circuit 127 shown in FIG. 20.

Referring to FIG. 21, DC—DC converters 301 and 302 are arranged to convert the voltage of the battery 128 into the voltage of 5 V. The output of the DC—DC converter 301 is connected to the lines 131 and 145 via switches 303 and 318. The output of the DC—DC converter 302 is arranged to be used in finding a power-decreased state of the battery 128 and also as power to be supplied to the system control unit 124. Resistors 304 and 305 are provided for supplying a reference voltage 306 to a comparator 310. This reference voltage is determined, by taking into consideration a ratio in which the voltage output of the battery 128 is divided by resistors 307 and 308, and is set at such a value that permits deciding a battery voltage level at which the battery 128 must be replaced. The reference voltage thus permits giving a warning that the supply of power will be shut off due to a power-decreased state. The voltage dividing resistors 307 and 308 are arranged to divide the voltage outputted from the battery 128 in such a way as to make it comparable with the reference voltage 306 at the comparator 310. Resistors 311 and 312 are provided for supplying a reference voltage 313 to a comparator 314. The reference voltage 313 is determined, considering the ratio of dividing the voltage output of the battery 128 by the voltage dividing resistors 307 and 308, and is set at such a value that the supply of power can be shut off due to a power-decreased state when the voltage reaches the set value. In other words, the reference voltage 313 is set at such a voltage level that, an operation of the system at a voltage lower than this level would bring forth a malfunction or a problem. In other words, the reference voltage 306 is set at a higher level than the other reference voltage 313. When a signal outputted from the comparator 310 and transmitted via the line 133 comes to indicate a power-decreased state, the system control unit 124 supplies an instruction for a power decrease display. Then, the arithmetic control device 107 causes the monitor 105, through the character generator 108, to display the power decrease. The power decrease display is made by causing characters reading "BATT" to flicker for informing the operator of arrival of time for replacing the battery 128 (see FIG. 3). When the signal coming from the comparator 314 through line 132 comes to show a powershutting-off voltage state as a result of a further decrease of power of the battery 128, the system control unit 124 causes switches 303 and 318 to open through the lines 134 and 146. By this, the supply of power to each of blocks of the video camera is cut off to forcibly bring the system to a stop, so that the system can be prevented from malfunctioning or having a problem.

In FIG. 20, reference numeral 135 denotes a pull-up resistor. Reference numeral 136 denotes a switch which is arranged to be used in combination with the switch 126 when adjustment (or calibration) is to be made for correcting a personal error of the visual line function.

As described in the foregoing, in controlling an apparatus according to the visual line of the operator by observing the visual line, the personal error of each individual operator necessitates the operator to make adjustment according to the personal error.

Figure 22:
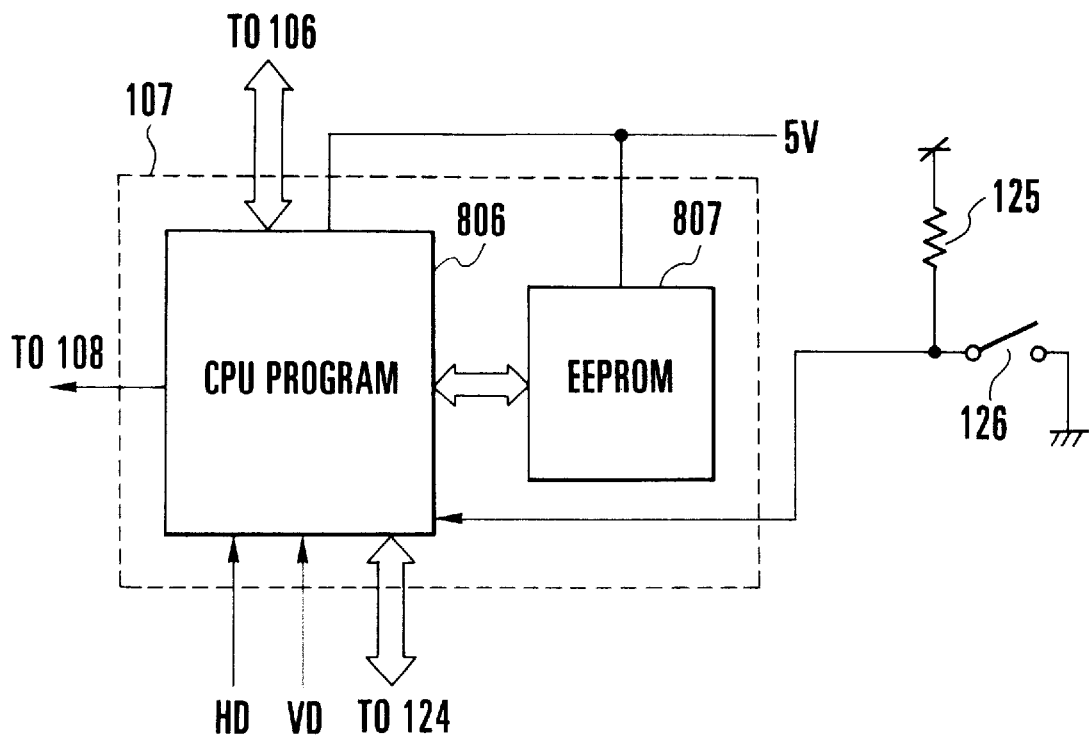
FIG. 22 is a block diagram showing the details of an arithmetic control device 107 shown in FIG. 20.

FIG. 22 shows the inside of the arithmetic control device 107. The inside of the arithmetic control device 107 is roughly divided into two parts. One part 806 is arranged to perform an arithmetic process and includes a temporary information storing device. The other part 807 is arranged to store, among others, information on the above-stated personal error, some other nontemporary information which remains in storage, unless erased by the operator or by someone adjusting the video camera, and information on the amount of adjustment relative to the error of the video camera as an individual product.

The part 807 is generally composed of an element such as EEPROM or the like that inhibits erasing or writing without some specific process. Rewriting the contents of the part 807, therefore, necessitates taking some procedures for executing a special program which is stored within the part 806 and is executable only in response to a special instruction.

One example of adjustment (calibration) of the visual-line function personal error is as described below.

Figure 23:
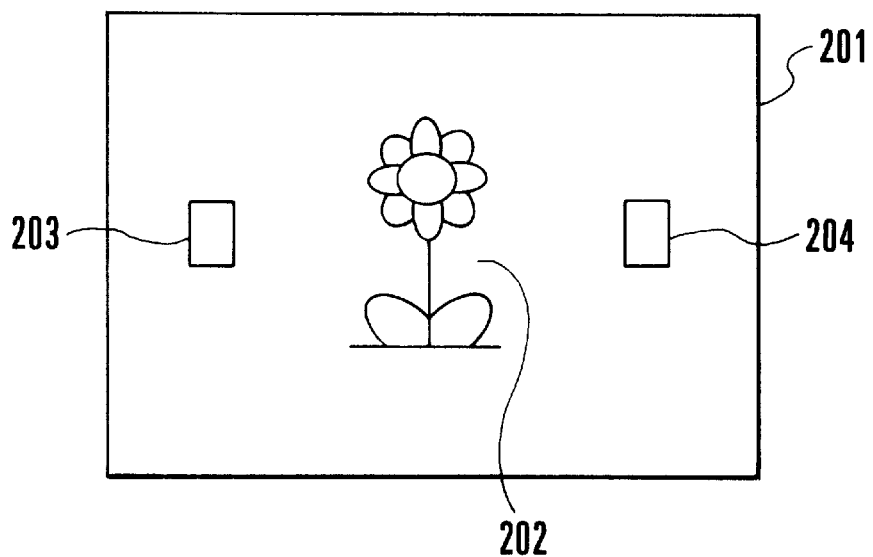
FIG. 23 shows by way of example a display made at a viewfinder in a case where a personal error in visual line function is to be adjusted.

FIG. 23 shows by way of example a display to be made within the viewfinder for use in adjusting the visual-line function personal error. The operator can shift the mode of the video camera to a visual-line function personal-error adjusting mode by closing the switch 136 which is shown in FIG. 20. With the video camera shifted to this mode, two visual-line function personal-error adjusting markers 203 and 204 are displayed as shown in FIG. 23. The operator looks first at the marker 203 and closes and opens the switch 126. The apparatus then confirms the visual line position obtained when the operator looks at the marker 203. The operator next looks at the other marker 204 and closes and opens the switch 126. The apparatus this time confirms the visual line position obtained when the operator looks at the marker 204. As a result, "information on coincidence in recognition between the operator and the apparatus" is obtained with the operator having looked at the markers 203 and 204. The information thus obtained is stored in the EEPROM 807. After that, the visual lines of this particular operator or user are observed by the apparatus on the basis of the information stored. If the user of the apparatus changes, the information stored in the EEPROM can be replaced with information on the new user.

This function makes the video camera easy to handle by anybody and is interesting to the operator.

However, with the video camera provided with the above-stated adjusting function for adjusting the personal-error of the operator, various problems are foreseeable.

While one battery is durable only about one to two hours thus necessitating frequent power shutting off actions, the above-stated personal-error adjusting function is arranged to be carried out any time. In a case where the information on the personal error is arranged to be stored in such a storage element that is dependent on an executing instruction from external software, such as an EEPROM, if unstableness of supply of power happens to increase due to a drop in the power during the process of storing the information, either some random figure might be written in for data of an address other than data of a predetermined address or some part other than designated data might be erased. Further, the power might be shut off due to a power-decreased state before the end of a limited period of time necessary for writing. In such a case, it is hardly possible to distinguish the value of applicable data from a previous value, from a state obtained after erasure, from a state obtained after completion of rewriting or from a completely erroneous value. Under such a condition, the credibility of data in storage would be lost.

With some abnormal data stored in the EEPROM 807 as mentioned above, a processing error might take place for some program to make it hardly executable. As a result, the system might come to a standstill.

The eighth embodiment of this invention is contrived to solve the above-stated problems. The eighth embodiment has an information storing function which is arranged such that the apparatus will never be caused to malfunction by an information storing process carried out in a power-decreased state.

In the case of this embodiment, when the switch 136 is closed by the operator for making the adjustment, etc., a check is made to find if a sufficient voltage is available from the battery 128. If it is anticipated, considering a length of time required for the adjustment, that the supply of power from the battery will become insufficient before completion of the adjustment intended, an action is taken, for example, to inhibit the mode of the apparatus from shifting to the adjustment mode. Further, during the period of the adjustment, etc., the supply of power to such parts of the apparatus that are not necessary for the adjustment, etc., is either cut off or limited (hereinafter this action is called "energy saving"). The energy saving action is performed to prevent the contents of storage from being destroyed by a decrease of power by minimizing unnecessary consumption of the electric energy stored in the battery.

The eighth embodiment and subsequent embodiments of this invention which have the above-stated information storing function are arranged as described below:

One embodiment having the information storing function includes storage means for storing information, means for erasing or writing information from or into the storage means, power-decreased state deciding means for deciding a power-decreased state of a power supply of the apparatus, and control means arranged to cause the power-decreased state deciding means to decide in response to an external operation and to allow the erasing and writing means to erase or write when the power supply is decided to be not in the power-decreased state.

Another embodiment having the information storing function includes storage means for storing information, means for performing an erasing or writing action on the storage means, power reducing means for reducing the supply of power to a part of the apparatus in which the reduced supply of power is not impedimental to the execution of the erasing or writing means, and control means arranged to cause the power reducing means to reduce the supply of power and to allow the erasing and writing means to erase or write in response to an external operation.

A further embodiment having the information storing function includes storage means for storing information, means for erasing or writing information from or into the storage means, power-decreased state deciding means for deciding a power-decreased state of a power supply of the apparatus, power reducing means for reducing the supply of power to a part of the apparatus in which the reduced supply of power is not impedimental to the execution of the erasing or writing means, and control means arranged to cause the power-reduced state deciding means to decide in response to an external operation and, when the power supply is decided to be not in the power-decreased state, to allow the power reducing means to reduce the supply of power and the erasing or writing means to perform the erasing or writing action.

With the embodiment arranged as mentioned above, the erasing or writing means is allowed to erase or write information from or into the storage means if the power supply is decided to be not in the power-decreased state when an external operation is performed. Further, the conditions of deciding the power-decreased state in response to an external operation are arranged to be variable. The embodiment is further arranged such that a display is made to indicate that the action of the erasing or writing means is not executable or a length of time required for the execution of the action of the erasing or writing means is limited when the power supply is decided to be in the power-decreased state.

Figure 24:
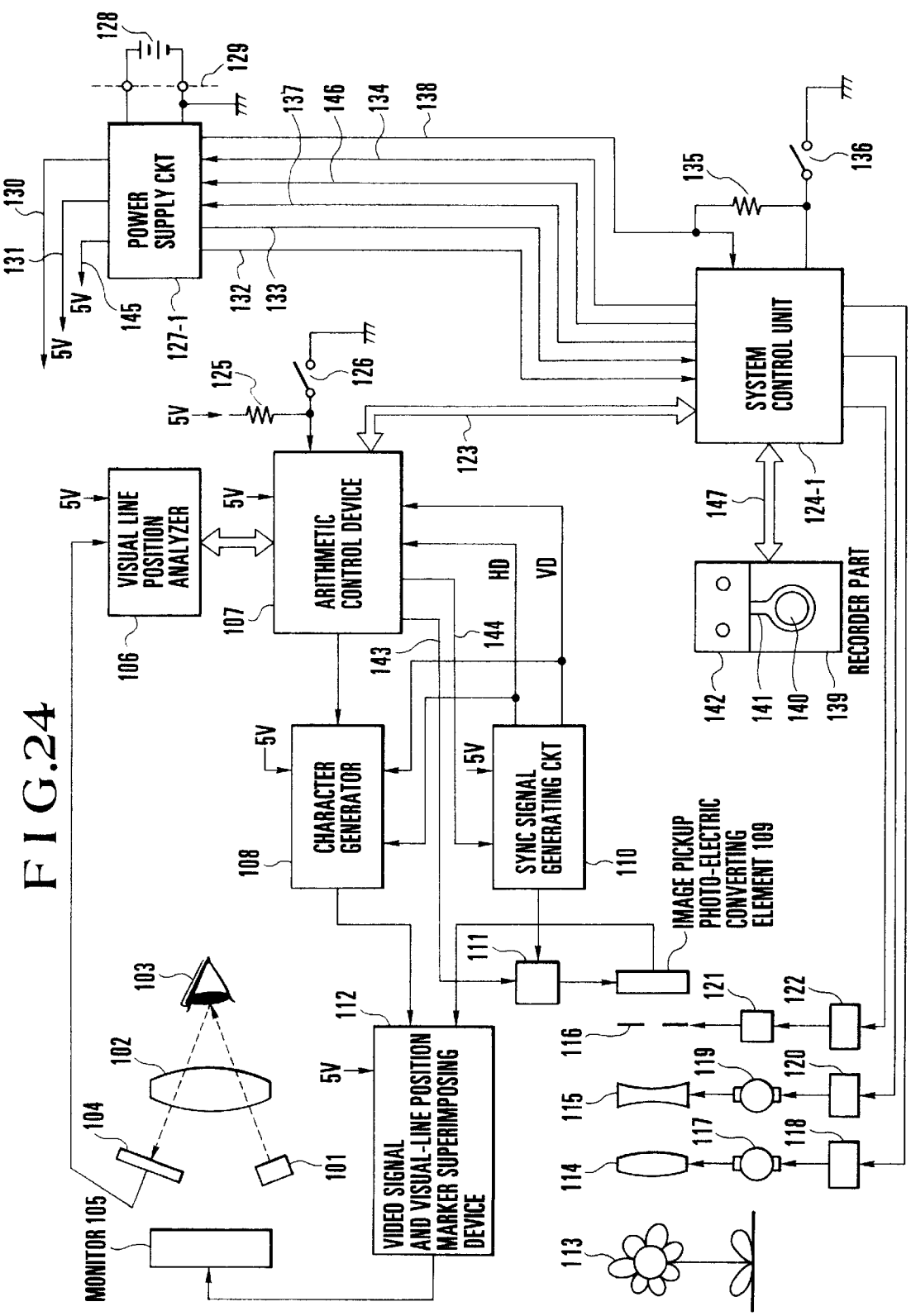
FIG. 24 is a block diagram showing the arrangement of an eighth embodiment of this invention.

The eighth embodiment of this invention is described in detail as follows. FIG. 24 is a block diagram showing the arrangement of a video camera which is the eighth embodiment. The arrangement is fundamentally the same as that of the video camera shown in FIG. 20 as a base of this embodiment. The eighth embodiment differs in that a line 137 is added to the lines leading from a system control unit 124-1 to a power supply circuit 127-1. This line 137 is arranged to transmit a signal for varying a reference voltage to be used by a comparator included in the power supply circuit 127-1. The following describes with reference to FIGS. 25 and 26 the details of work to be performed through the line 137.

Figure 25:
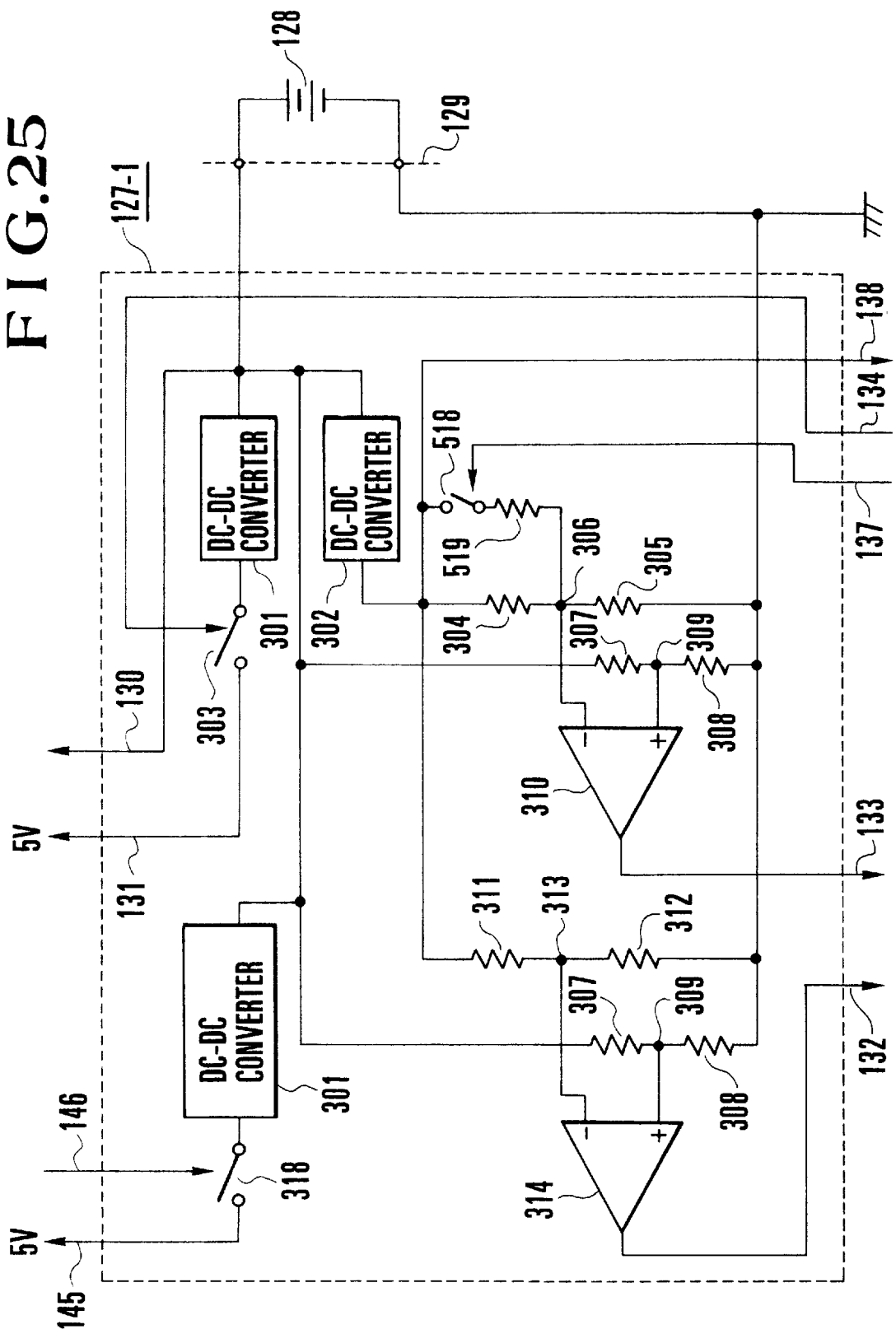
FIG. 25 is a circuit diagram showing the details of a power supply circuit 127-1 shown in FIG. 24.

FIG. 25 shows an improvement applied to the arrangement of FIG. 21 according to this invention. In FIG. 25, reference numeral 518 denotes a switch which is arranged to open and close according to an opening and closing instruction sent from the system control unit 124-1. Reference numeral 519 denotes a resistor.

Figure 26:
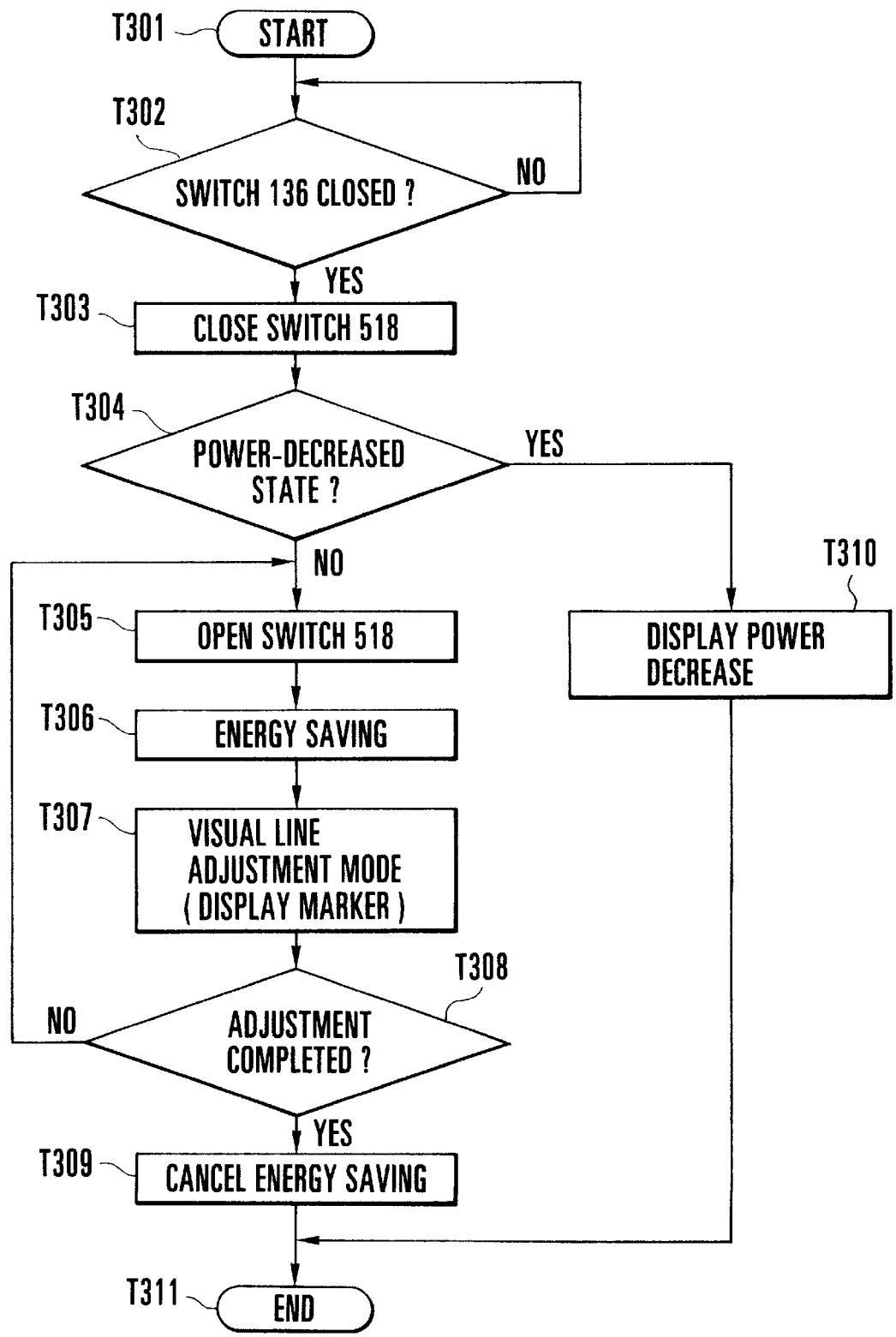
FIG. 26 is a flow chart showing the operation of the eighth embodiment of this invention.
Figure 27:
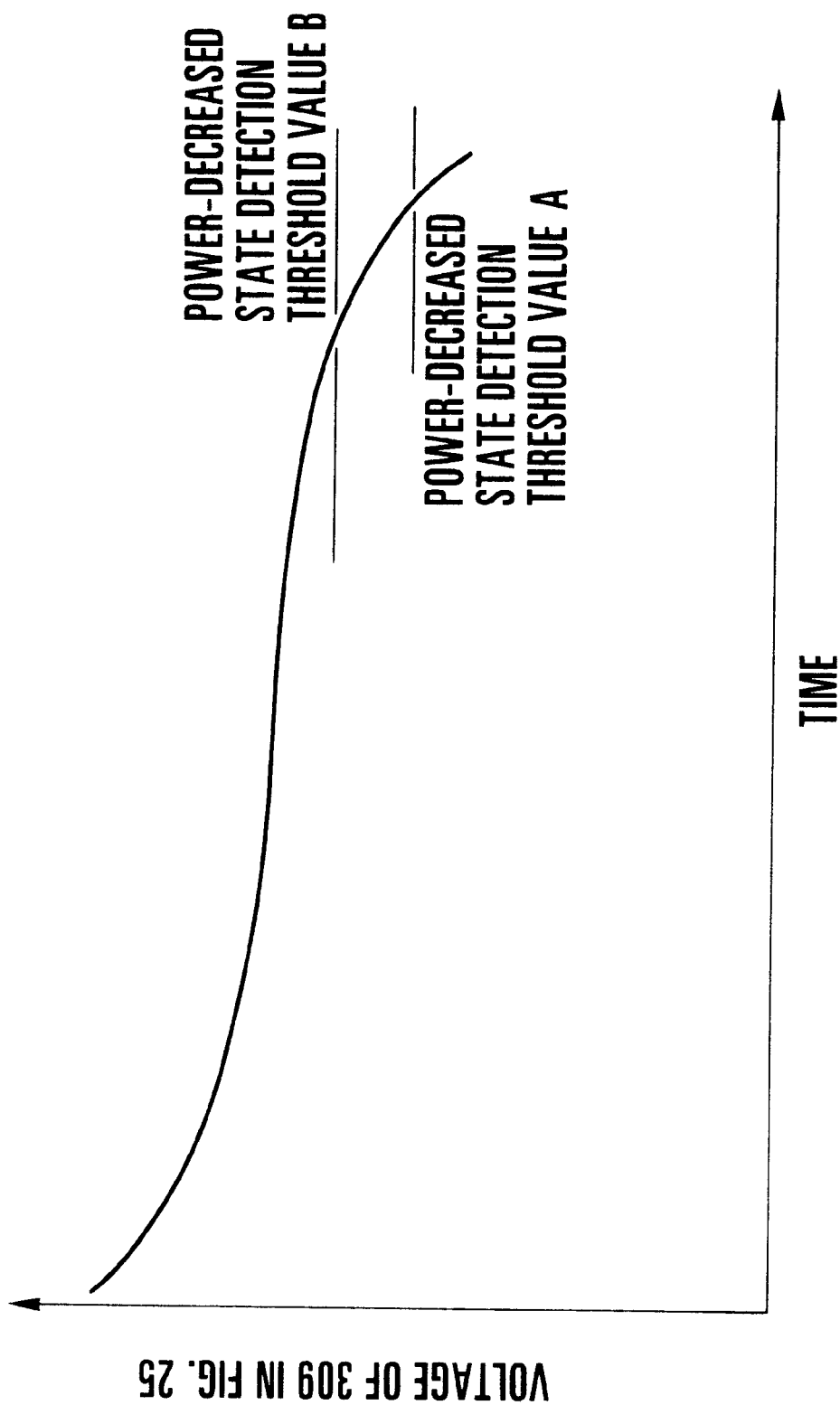
FIG. 27 is a graph showing the operation of the eighth embodiment of this invention.

FIG. 26 is a flow chart showing the flow of operation of the eighth embodiment. Referring to FIG. 26, the execution of processes commences at a step T301. The flow of operation remains in a standby state without coming to a visual-line function adjustment mode until the switch 136 is closed by the operator. When the switch 136 is closed, the operator is supposed to be making adjustment of the visual line function from now and the system control unit 124-1 causes the switch 518 to close through the line 137. FIG. 27 shows in a graph the state of discharge taking place at a predetermined amount of current. The time of discharge is shown on the axis of abscissa. The axis of ordinate shows the voltage of the input 309 on the noninverting side of the comparator 310 of FIG. 25. When the switch 518 is closed, the reference voltage 306 of the comparator 310 rises to an extent corresponding to the insertion of a resistor 519 in parallel to the resistor 304. Then, as shown in FIG. 27, a normal power-decreased state detection threshold value A is changed to a power-decreased state detection threshold value B to be used for the adjustment. In other words, the time for deciding a power-decreased state is caused to become earlier by this change.

At a step T304, the output of the comparator 310 is taken in with the switch 518 closed. If the output indicates a power-decreased state, the flow of operation comes to a step T310 to make a display indicating a power-decreased state within the viewfinder to urge the operator to make again the visual line function adjustment after replacing the battery. If the output of the comparator 310 is found not indicating a power-decreased state, the flow comes to a step T305 on the assumption that a sufficient amount of power can be supplied during the process of visual-line function adjustment, because the battery indicates a voltage value higher than the current power-decreased state detection threshold value B which is higher than a normal power-decreased state detection threshold value A. At the step T305, the power-decreased state detection threshold value B is shifted back to the power-decreased state detection threshold value A by opening the switch 518. At a step T306, the system control unit 124-1 performs the energy saving action, in such a way as to limit a driving action on the recorder part 139 which is not necessary for the adjustment of the visual-line function, through the communication line 147, to limit driving actions on the driving circuit 111 of the image pickup photo-electric converting element 109 and the synchronizing signal generating circuit 110 through the communication line 123, the arithmetic control device 107 and the lines 143 and 144, and to cut off the output of the line 145 by opening the switch 318 through the line 146. The flow then comes to a step T307 to shift the mode of the apparatus to the visual-line function adjustment mode.

In the visual-line function adjustment mode, the adjusting markers 203 and 204 are displayed within the viewfinder as shown in FIG. 23. In a case where the driving action of the driving circuit 111 is to be limited, the operator is enabled to know the commencement of the adjustment mode by putting out, at the same time, the display of the image being picked up by the video camera. At a step T308, a check is made to find if the visual-line function adjustment has been completed. If not, the flow comes back to the step T305. If so, the flow comes to a step T309. At the step T309, instructions are outputted for cancellation of the energy saving action through the same hardware-like routes as the routes taken at the commencement of the energy saving action. At a step T311, the flow of operation comes to an end.

The resistance value of the resistor 519 which is shown in FIG. 25 is determined according to the length of time required for the normal visual-line function adjustment, the amount of power to be consumed by the video camera while the visual-line function adjustment is in process and a curve indicating the amount of power of the battery decreasing with the lapse of time and is set at such a value that ensures that a sufficient amount of power can be supplied while the adjustment of the visual-line function is in process.

Figure 28:
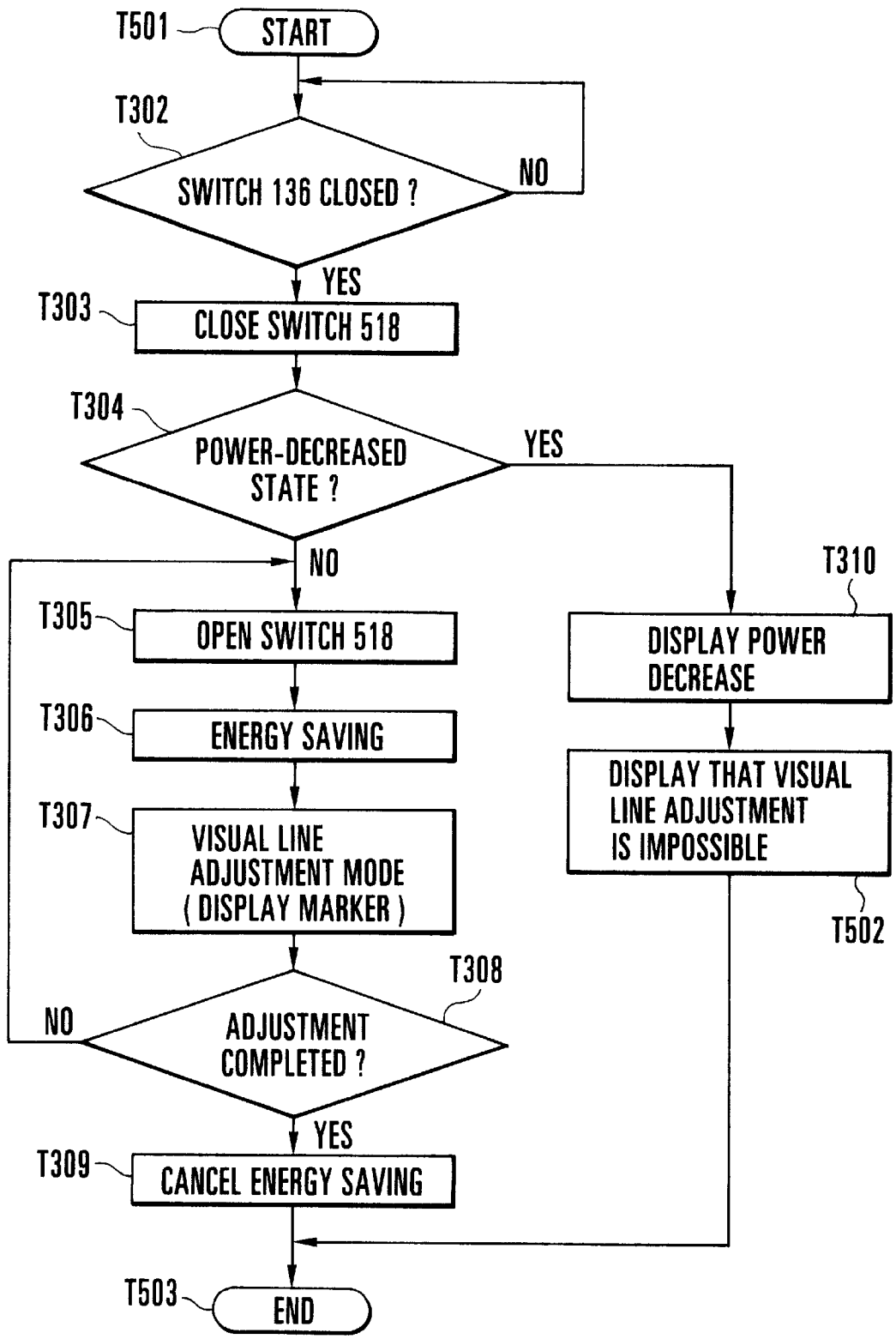
FIG. 28 is a flow chart showing the operation of a ninth embodiment of this invention.

A ninth embodiment of this invention is next described as follows. FIG. 28 is a flow chart showing the operation of the ninth embodiment. The ninth embodiment is arranged to make a display within the viewfinder indicating that "the visual line adjustment is impossible due to a power-decreased state", for example, by simultaneously flickering all the visual line adjusting markers 203 and 204 and a power-decrease display.

Referring to FIG. 28, when the flow of execution of processes begins at a step T501, a decision is made in the same manner as what is done in the case of FIG. 26 as to whether the visual line function is to be adjusted. If the battery is found to be in a power-decreased state at the step T304, the flow comes to the step T310 to make a power-decrease display in the same manner as the flow of FIG. 26. After the step T310, the flow comes to a step T502. At the step T502, a display is made to inform the operator that the visual-line (function) adjustment is impossible, for example, by causing the visual-line adjusting markers 203 and 204 to flicker as mentioned above. The flow then comes to an end at a step T504.

Figure 29:
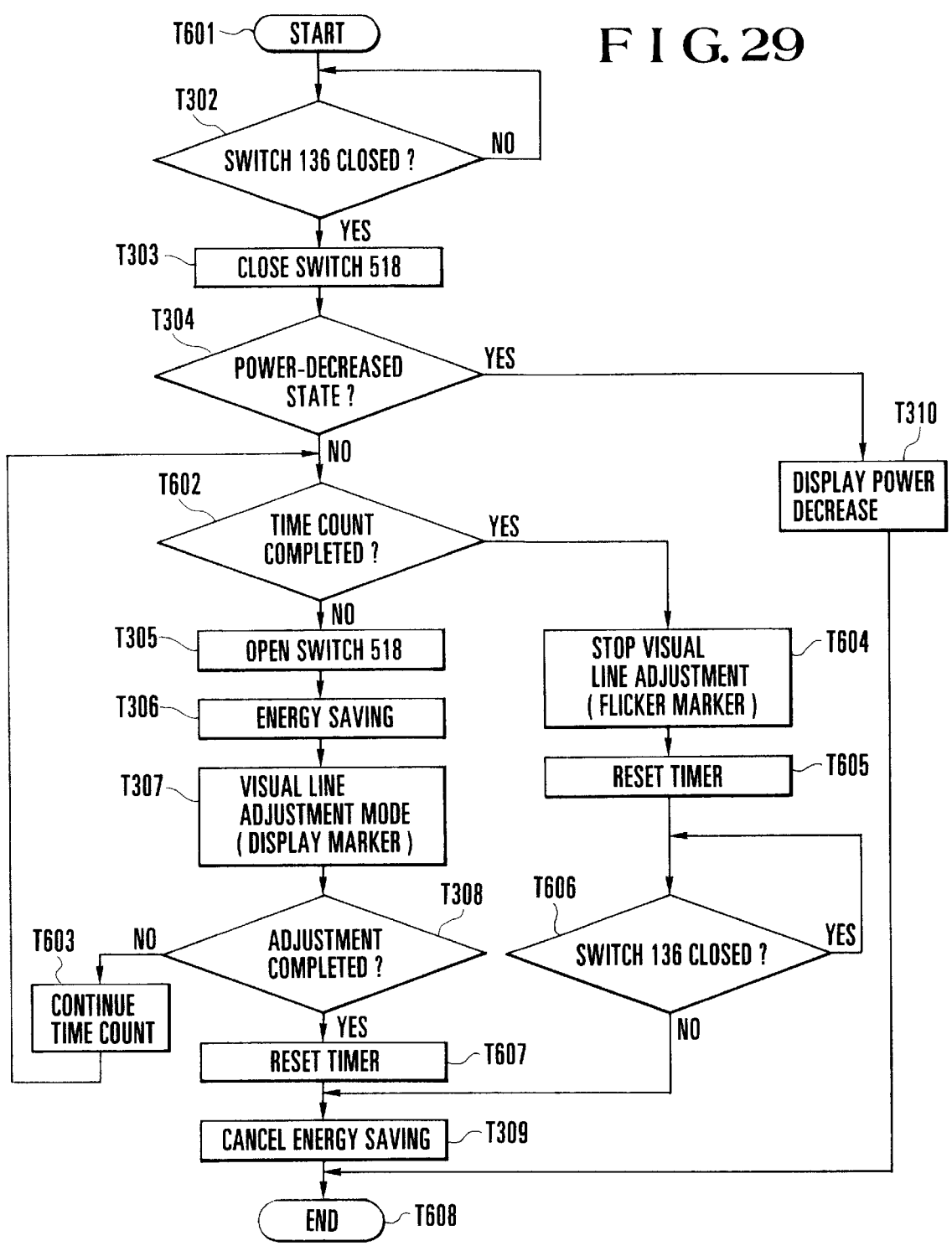
FIG. 29 is a flow chart showing the operation of a tenth embodiment of this invention.

A tenth embodiment of this invention is described as follows. FIG. 29 is a flow chart showing the operation of the tenth embodiment. The tenth embodiment is arranged to include a function in addition to the functions of the eighth and ninth embodiments described above. For simplification, this embodiment is described below in such a way as to supplement what has been described with reference to FIG. 26 which shows the eighth embodiment.

The point of improvement made by this embodiment is as follows. The value of the resistor 519 of FIG. 25 is determined according to a curve showing the amount of decrease of power of the battery taking place in relation to the lapse of time as shown in FIG. 27, the amount of power consumed by the video camera during the period of the adjustment and a length of time normally required for the visual-line adjustment. The curve of the decreasing amount of power of the battery and the amount of power to be consumed by the video camera are graspable when the video camera is in the stage of designing. However, the length of adjustment time involves some personal error (differences between individuals) and is not accurately graspable in the stage of designing. In the cases of the eighth and ninth embodiments, once the battery is found to be not in a power-decreased state at the step T304, the process of visual-line adjustment is repeated irrespective of any power-decreased state that might take place thereafter. In other words, the process for adjustment is determined without paying any heed to the personal error involved in the adjustment time.

It is conceivable, for solving this problem, to always make a check for a power-decreased state and to bring the visual-line adjustment to a stop whenever a power-decreased state is found. However, if the embodiment is in process of writing into the storage element, the writing must be carried out despite the power-decreased state. Therefore, this problem, which has heretofore remained unsolved, cannot be adequately solvable by such a method.

In view of this problem, the tenth embodiment is arranged to impose a limitation on the length of time allowable for the visual-line adjustment and to determine the value of the resistor 519 according to the limited length of time thus set. This arrangement removes the uncertainty which existed in the stage of designing and more reliably protects the contents of the storage element.

Referring to FIG. 29, when the flow of operation begins at a step T601, the flow comes to the step T302 to close the switch 136. After that, the flow remains in a standby state until the video camera is instructed by the operator to shift to the visual-line adjustment mode.

When the switch 136 is closed, the switch 518 closes. The flow then comes to the step T304 to make a check for a power-decreased state. If the battery is found to be in a power-decreased state, the flow comes to the step T310 to display the decrease of power and video camera does not shift to the visual-line adjustment mode. If the battery is found to be not in a power-decreased state at the step T304, the flow comes to a step T602. At the step T602, a check is made to find if the value of a counter which is specially set has reached a predetermined value. If not, the flow comes to the step T305 to open the switch 518. At the step T306, the energy saving process is executed. At the step T307, the visual-line adjusting markers are displayed and the video camera enters into the visual-line adjustment mode. At the step T308, a check is made to find if the adjustment has been completed. If not, the flow comes to a step T603. At the step T603, the value of the timer is incremented and then the flow comes back to the process of the step T602. With the adjustment found not completed at the step T308, the processes of the adjustment program are thus repeatedly executed by incrementing the value of the timer. If the adjustment is found to have been completed at the step T308, the flow comes to a step T607. At the step T607, the timer is reset. At the step T309, the state of energy saving is canceled and the flow comes to an end at a step T608.

When the value of the timer comes to exceed a predetermined value while the adjustment is in process, the excessive value is found at the step T602. The flow then comes to a step T604. At the step T604, the operator is informed that the process of visual-line adjustment comes to a stop, for example, by causing the adjusting markers 203 and 204 to flicker for several seconds or in some other suitable manner. At a step T605, the timer is reset. At a step T606, the switch 136 is checked to make sure that the switch 136 is open. If the switch 136 is left closed, the flow of operation might again enter into the process of the visual-line adjustment when the step T601 is executed after completion of the process of the step T608. The step T606 is inserted for the purpose of preventing this trouble. After it is confirmed that the switch 136 is open at the step T606, the flow comes to the step T309 to cancel the state of energy saving and, after that, comes to an end at the step T608.

The length of time allowable for the visual-line adjustment mode is limited by the processes described above. The value of the resistor 519 can be determined according to the time thus limited. Therefore, while the concepts of the eighth and ninth embodiments are adopted by the tenth embodiment, the tenth embodiment is arranged to be capable of more reliably protecting the contents of the storage element.

Figure 30:
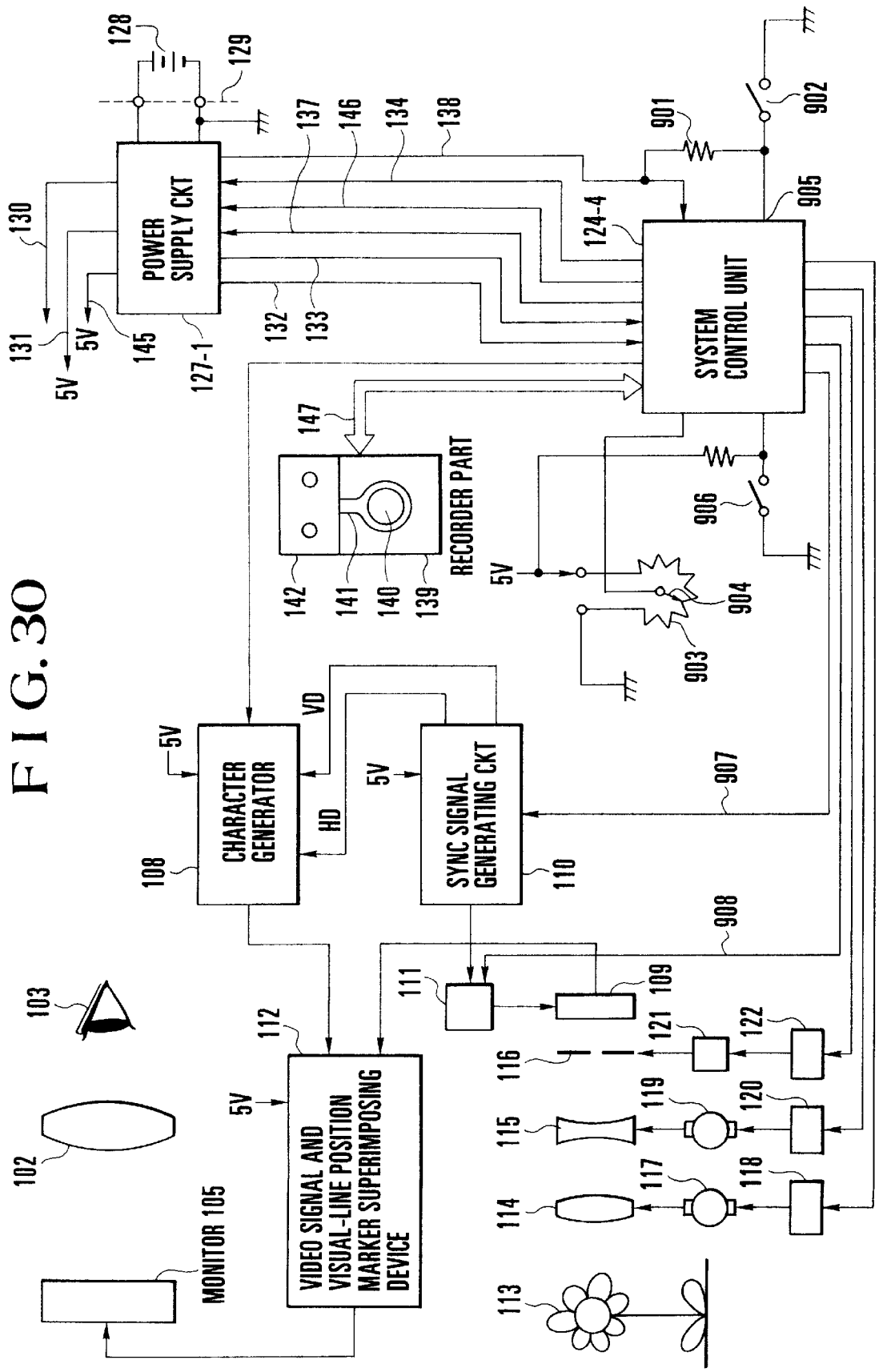
FIG. 30 is a block diagram showing the arrangement of an eleventh embodiment of this invention.

An eleventh embodiment of this invention is next described as follows. FIG. 30 shows in a block diagram the arrangement of the eleventh embodiment. This is an example of arrangement for title selection.

In FIG. 30, a title selecting function is added to the system control unit with the blocks related to the visual line function omitted from the illustration of FIG. 24. The titles to be processed are something like the title 805 shown by way of example in FIG. 12. Each title selected consists of characters, etc., and is arranged to be displayed and recorded in a state of being superimposed on the image of an object of shooting 802.

The arrangement for the title s electing function shown in FIG. 30 operates in the following manner. For example, when a switch 902 which is connected to a system control unit 124-4 is closed, a voltage level at an input terminal 905 of the system control unit 124-4 which has been kept at a high level by a resistor 901 becomes low to activate the title selecting function. A switch 906 is used in deciding characters to be used and in selecting each character from among characters (letters), etc., located in different positions. More specifically, the first character 804 which is a letter "F" as shown in FIG. 12 flickers when the switch 902 is closed. When a potentiometer 904 is turned round under this condition, the letter on display changes from the letter "F" in the alphabetical order of F-G-H-I-J - - - according to changes taking place in potential. If it is desired to leave the letter "F" as it is and to change the character 803 which is "L" in FIG. 12, the switch 906 is closed and opened once at the position of "F" without turning the potentiometer 904. This causes the flickering position to shift to the character 803. The letter (character) "F" is then stored in the storage element as it is. Then, at the position of the character 803, the potentiometer 904 is turned to select a suitable character. The character thus selected is caused to be stored in the storage element by closing and opening the switch 906 once and the flickering position shifts to a next character position. Upon completion of all the characters as desired, the switch 902 is opened to bring the video camera back to its normal operating state. The instructions for energy saving are sent from the system control unit 124-4 through lines 907 and 908.

Figure 31:
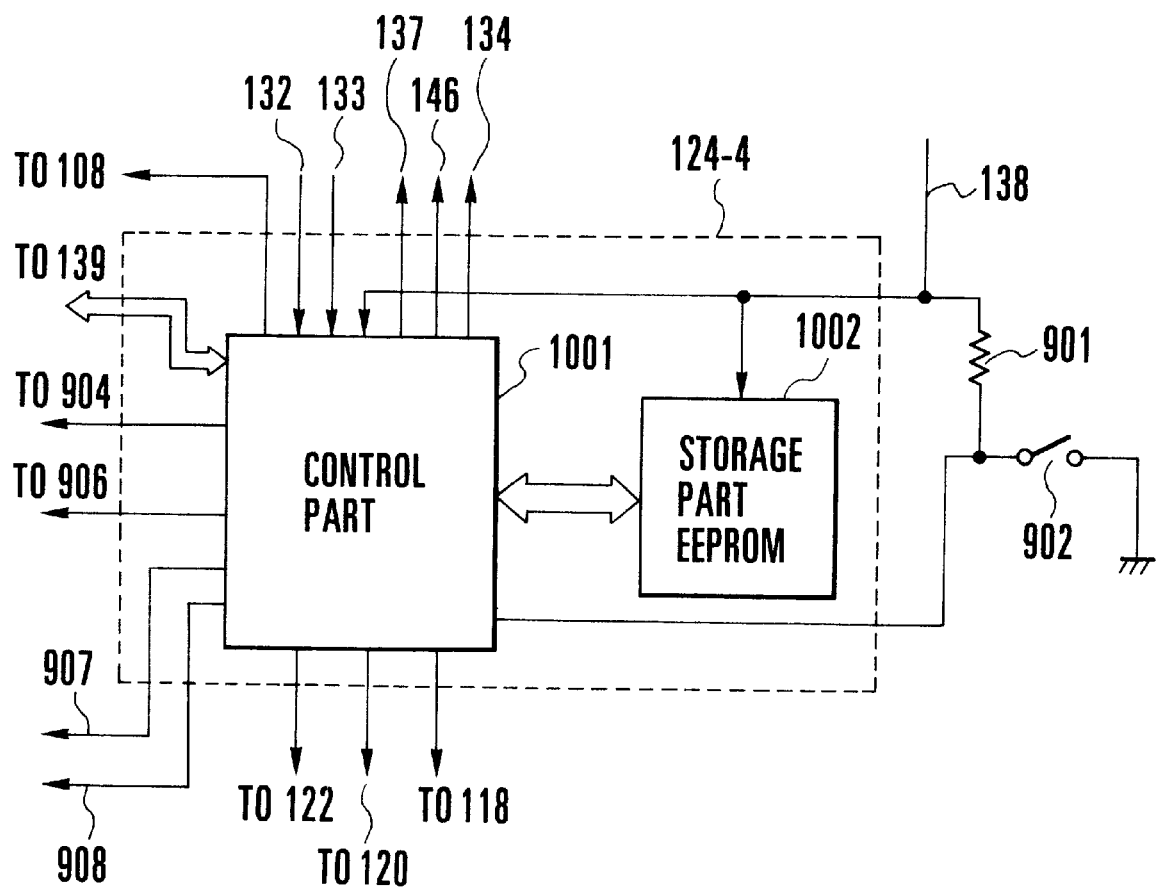
FIG. 31 is a block diagram showing the details of a system control unit 124-4 shown in FIG. 30.

The arrangement of the storage element included in the system control unit 124-4 is described referring to FIG. 31 as follows. Like the arithmetic control device 107 of FIG. 22, the inside of the system control unit 124-4 is also divided into a control part 1001 and a storage part 1002. The storage part 1002 is composed of a storage element such as an EEPROM that permits erasing or rewriting to be executed only through a special process like the EEPROM 807 of FIG. 22. Therefore, if a power-decreased state takes place while the special process is in process, a serious malfunction might take place as mentioned in the description of the eighth embodiment.

The power supply (a line 138) for the system control unit 124-4 is arranged not to be shut off by the switch 308 of the power supply circuit 127-1 (see FIG. 25). Therefore, the system control unit 124-4 tends to be actuated even by a low power supply voltage. However, both the control part 1001 and the storage part 1002 are apt to malfunction if the power supply fails to adequately meet necessary conditions. It is, therefore, important to allow a rewriting action on the storage element while keeping the state of the power supply under surveillance.

Figure 32:
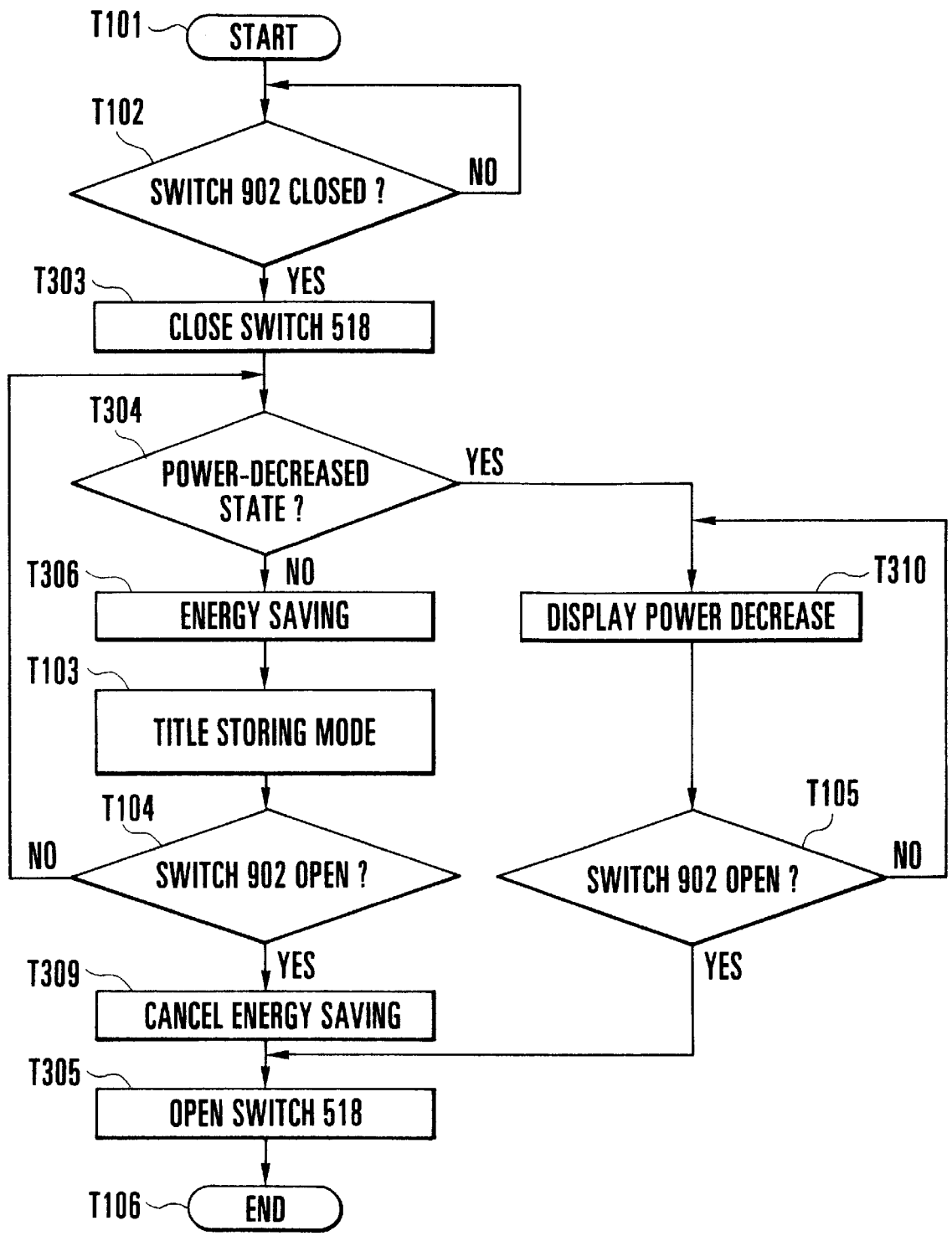
FIG. 32 is a flow chart showing the operation of the eleventh embodiment of this invention.

FIG. 32 is a flow chart showing by way of example a storage element protecting program to be used by the system control unit 124-4 in storing a character title. Referring to FIG. 32, when the processes of the program begin to be executed at a step T101, the flow of operation comes to a step T102 to check the switch 902 for its closed state. If the switch 902 is found open, the operator is supposed to be not changing a character title. The flow, therefore, remains in a standby state without proceeding further. When the switch 902 is found closed at the step T102, the flow comes to the step T303. At the step T303, the switch 518 (see FIG. 25) is closed to raise the power-decreased state detection threshold value. At the step T304, if the power supply is decided to be in a power-decreased state by using the higher power-decreased state detection threshold value, the flow comes to a step T310. At the step T310, the decrease of power is displayed and no character title is selected and stored. Further, if the power supply is decided to be not in a power-decreased state at the step T304, the flow comes to the step T306 to execute the energy saving process. After the step T306, the flow comes to a step T103. At the step T103, a character title is selected and stored. At a step T104, the switch 902 is checked for its state. If the switch 902 is found to be open thus indicating that a character title has been selected by the operator and stored, the flow comes to the step T309 to cancel the state of energy saving. The flow then comes to the step T305 to bring the power-decreased state detection threshold value back to its normal value by opening the switch 518. At a step T106, the flow comes to an end. If the switch 902 is found to be closed at the step T104, the flow comes back to the step T304 to repeat the processes described above, because the title selecting and storing processes might be continuously performed.

After that, if th e power supply is decided to be in a power-decreased state at the step T304, the decrease of power is displayed like in the case of the eighth embodiment. The power-decrease display is repeated so long as the switch 902 is found closed at the step T105. When the switch is found to be open at the step T105, the flow comes to the step T305 to open the switch 518 and the flow comes to an end at the step T106.

Figure 33:
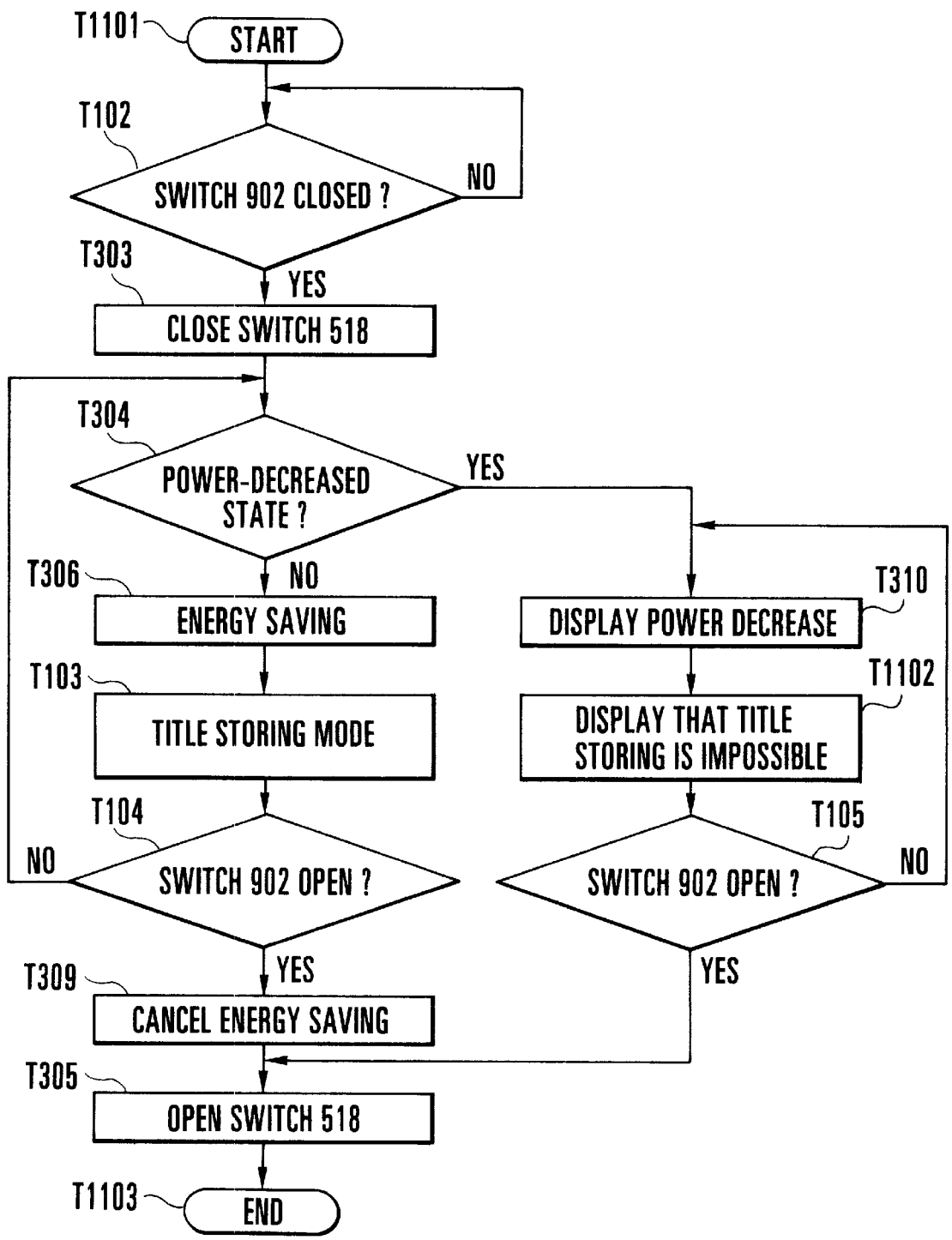
FIG. 33 is a flow chart showing the operation of a twelfth embodiment of this invention.

Fig. 33 shows in a flow chart a twelfth embodiment of this invention which is a modification of the eleventh embodiment. In this case, a step T1102 of making a display indicating that the title cannot be stored is added to the processes of FIG. 32. This display is made, for example, by flickering all the characters of an existing title. If no characters have been stored as the existing title, some character or characters may be displayed in a suitable manner.

Figure 34:
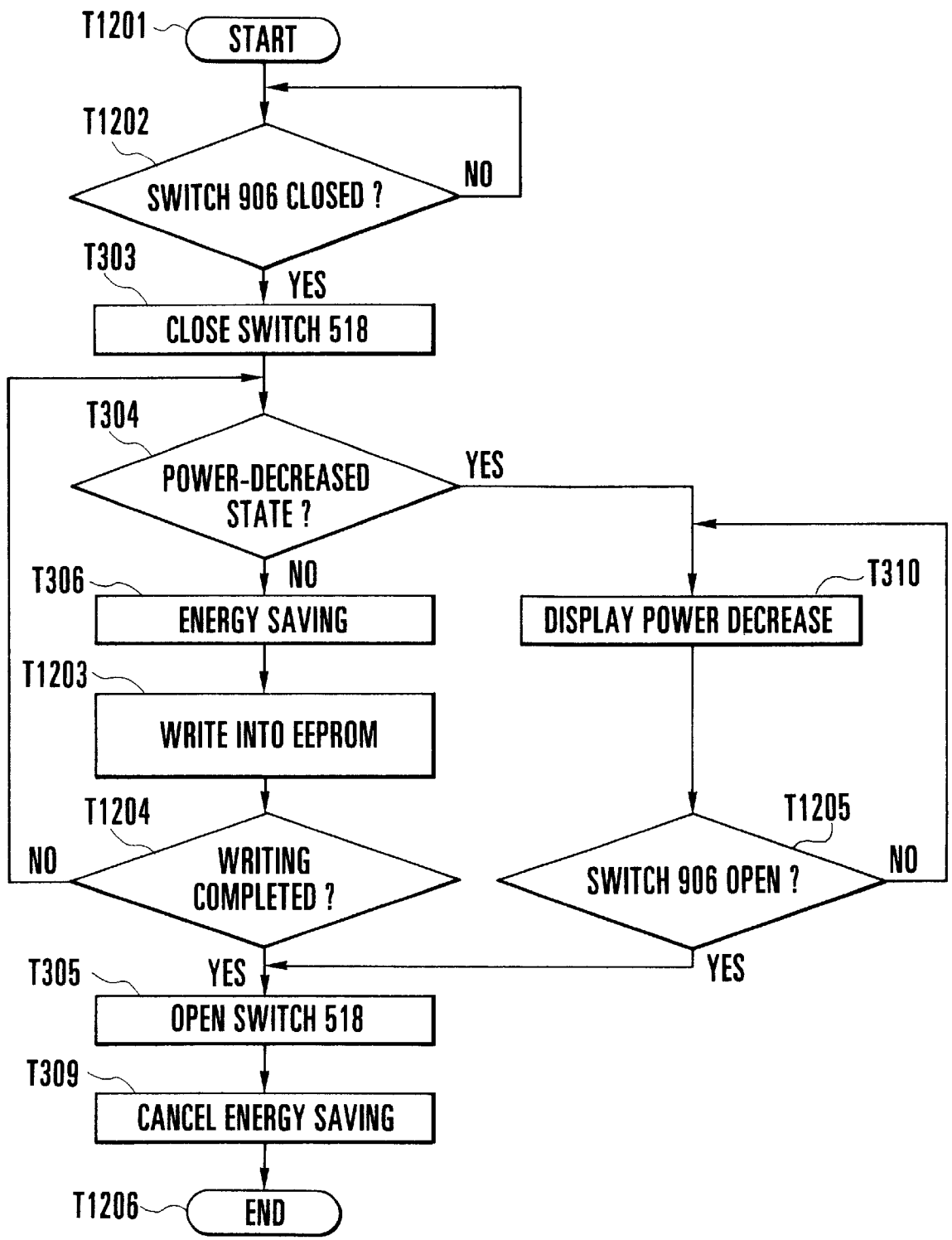
FIG. 34 is a flow chart showing the operation of a thirteenth embodiment of this invention.

A thirteenth embodiment of this invention is described as follows. FIG. 34 is a flow chart showing the flow of operation of the thirteenth embodiment. The arrangement of this embodiment is the same as that of the eleventh embodiment shown in FIGS. 30 and 31. The applications of the arrangement of this embodiment are also similar to those of the eleventh embodiment. This embodiment is arranged by way of example to dispense with the use of the switch 902 which is shown in FIG. 30.

Referring to FIG. 34, when the flow of operation begins at a step T1201, the flow comes to a step T1202. At the step T1202, a check is made for the state of the switch 906 (shown in FIG. 30). If the switch 906 is not closed, it is not necessary to gain any access to the storage part 1002 (shown in FIG. 31) and, therefore, the contents of the storage are never destroyed even if the power supply falls into a power-decreased state. With the switch 906 found to be open, therefore, the flow remains in a standby state without executing any process.

When the switch 906 is found to be closed at the step T1202, the flow comes to the step T303 to raise the power-decreased state detection threshold value by closing the switch 518. At the step T304, a check is made for the voltage of the battery by using the higher power-deceased state detection threshold value. If the battery is thus found to be not in a power-decreased state, the flow comes to the step T306. At the step T306, the energy saving process is executed. After the energy saving process, the flow comes to a step T1203. At the step T1203, the kinds of characters designated are stored in the storage part 1002. At a step T1204, a check is made to find if the storing (writing) action has been completed. If not, the flow comes back to the step T304 to continue this action. If the writing action on the storage part 1002 is found to have been completed, the flow comes to the step T305 to open the switch 518. At the step T309, the energy saving state is canceled. The flow comes to an end at a step T1206. If the battery is found to be in a power-decreased state at the step T304, the flow comes to the step T310 to display the decrease of power and then comes to a step T1205. The display of the decrease of power made at the step T310 is allowed to continue until the switch 906 is found to be open at the step T1205. When the switch 906 is found to be open, the flow comes to the step T305 to open the switch 518 on the assumption that the operator has been informed of the power-decreased state. The flow then comes to the step T1206 to terminate the flow.

Figure 35:
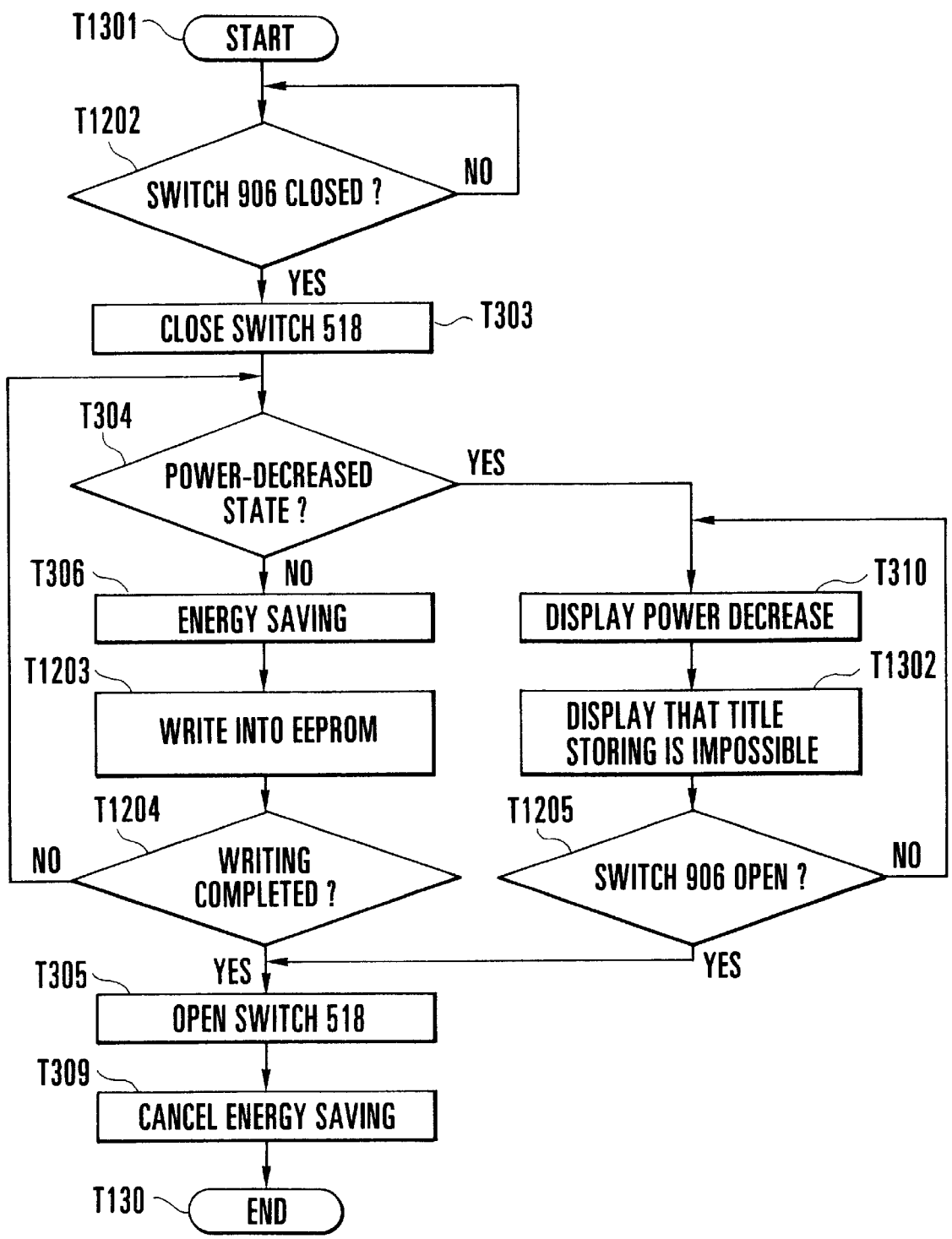
FIG. 35 is a flow chart showing the operation of a fourteenth embodiment of this invention which is a modification of the thirteenth embodiment.

FIG. 35 shows the flow of operation of a fourteenth embodiment which is a modification of the thirteenth embodiment. In this case, an additional step T1302 is provided for making a display indicating that the title storing action of FIG. 34 is not allowed.

Figure 36:
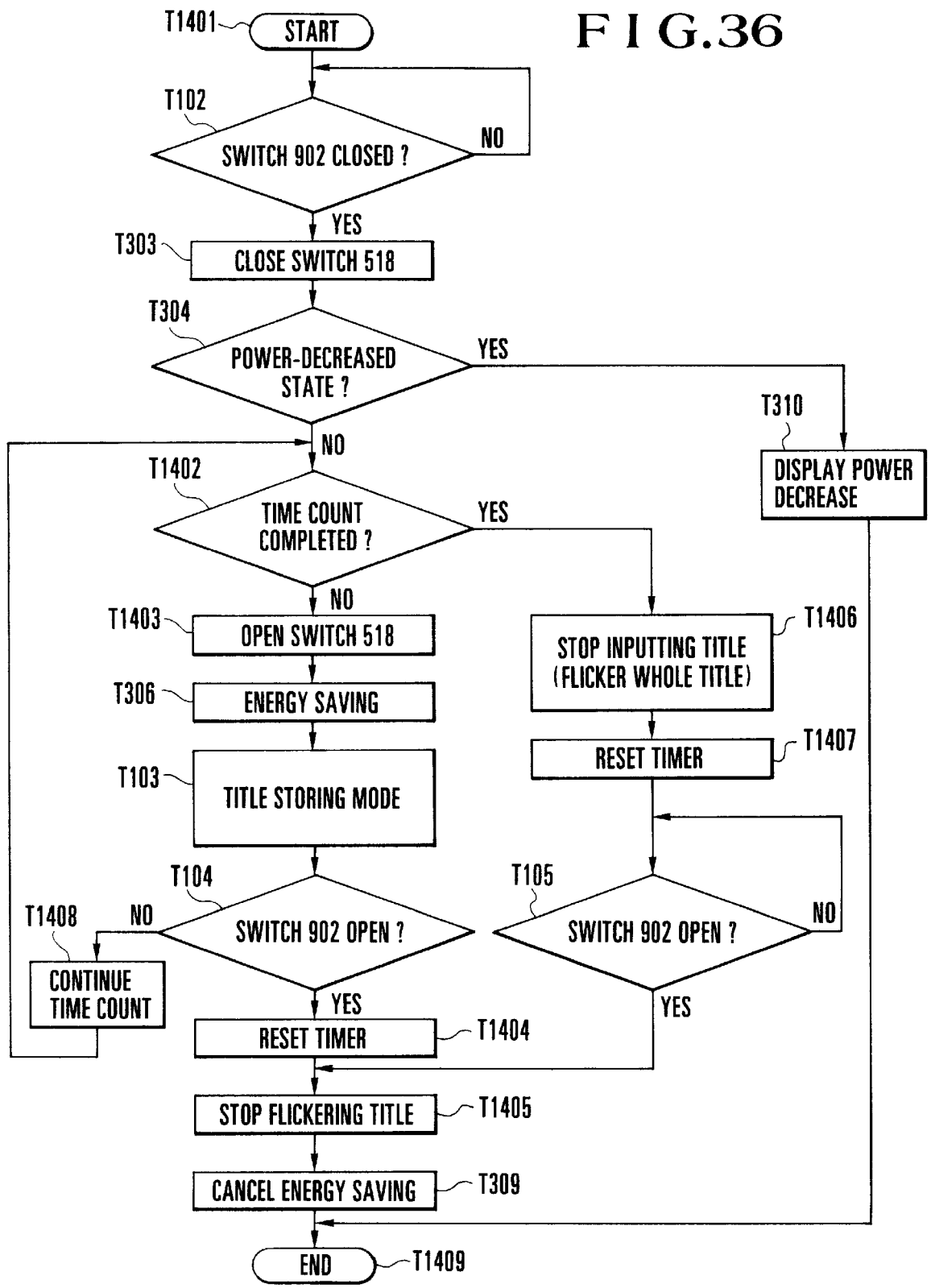
FIG. 36 is a flow chart showing the operation of a fifteenth embodiment of this invention.

A fifteenth embodiment of this invention is described as follows. FIG. 36 is a flow chart showing the flow of operation of the fifteenth embodiment. The fifteenth embodiment includes a function which supplements the functions of the eleventh and thirteenth embodiments. The description of the operation of this embodiment is, therefore, simply given by way of supplementing the operation of the eleventh embodiment shown in FIG. 32.

The point of improvement made by this embodiment is as follows. The value of the resistor 519 which is shown in FIG. 25 is determined according to a curve which represents the amount of power decrease of the battery in relation to the lapse of time, the amount of power consumed by the video camera in inputting characters and a standard length of time generally required for inputting characters. The curve of the amount of power decrease of the battery and the amount of power consumed by the video camera are graspable in the stage of designing the camera. However, the length of character inputting time involves some personal error (differences between individuals) and is not accurately graspable in the stage of designing. In the cases of the eleventh and thirteenth embodiments, once the battery is decided to be not in a power-decreased state at the step T304, the character inputting action is repeated irrespective of any power decreasing state taking place in the battery thereafter. In other words, the personal error (or an individual difference) of the length of time required in inputting characters is not taken into consideration. It is conceivable to solve this problem by continuously making a check for a power-decreased state and by bringing the character inputting action to a stop when a power-decreased state is found. However, according to this method, if the power-decreased state takes place while writing into the storage element is in process, the writing action cannot but be carried out despite the power-decreased state. This problem which has heretofore remained unsolved, therefore, cannot be completely solvable by this method.

To solve this problem, the fifteenth embodiment is arranged to limit a length of time allowable for the character inputting action and to determine the value of the resistor 519 according to the time limited. The arrangement effectively removes the uncertainty existing in the stage of designing and more reliably protects the contents of the storage element.

Referring to FIG. 36, when the flow of operation begins at a step T1401, the flow comes to the step T102 to remain in a standby state until the operator closes the switch 902 to instruct the video camera to shift to the mode of inputting characters.

When the switch is found closed at the step T102, the flow comes to the step T303 to close the switch 518 in the same manner as the eleventh embodiment. At the step T304, a check is made to find if the battery is in a power-decreased state. If so, the flow comes to the step T310 to display the decrease of power in the same manner as the eleventh embodiment. If not, the flow comes to a step T1402. At the step T1402, a timer which is specially set is checked to find if its value has reached a predetermined value. If not, the flow comes to a step T1403. At the step T1403, the switch 518 is opened. At the step T306, the energy saving process is executed. After the energy saving process, the flow comes to the step T103 to allow characters to be inputted. For this, the embodiment is arranged, for example, to cause only such a character that is being changed to be flickered by turning round the potentiometer 904 (see FIG. 30). At the step T104, a check is made to find if the switch 902 is open. If not, the flow comes to a step T1408. At the step T1408, the value of the timer is incremented. After the step T1408, the flow comes back to the step T1402. If the character inputting process has not been completed, the programmed process of inputting characters is repeatedly executed while incrementing the value of the timer. If the switch 902 is found open at the step T104, the operator is supposed to have finished the character inputting action and comes to a step T1404. At the step T1404, the timer is reset. At a step T1405, a flickering character (title) display is brought to a stop. At the step T309, the energy saving state is canceled and the flow of operation comes to an end at a step T1409.

In a case where the value of the timer comes to exceed the predetermined value while the character input action is still in process, this state is detected at the step T1402 and the flow comes to a step T1406. At the step T1406, a display is made to show the operator that the process of inputting characters (title) has been brought to a stop due to expiration of the limited time, for example, by flickering all the characters of a title on display. At a step T1407, the timer is reset. At the step T105, the switch 902 is checked for its open state. If the switch 902 is left in its closed state while the processes of the step T1401 and the subsequent steps are executed again after the flow of operation is terminated at the step T1409, the character inputting process might be allowed to be executed. The step T105 is provided for preventing this trouble. After confirmation of the open state of the switch 902, the flow comes to the step T1405 to bring the flickering of all the title characters to a stop. The energy saving process is canceled at the step T309 and the flow is terminated at the step T1409.

Since the length of time allowed for the mode of inputting characters is limited through the processes described above, the resistance value of the resistor 519 can be determined according to the limited time. The fifteenth embodiment is thus arranged to be capable of more reliably protecting the contents of the storage element while adopting the same concepts as those of the eleventh and thirteenth embodiments.

A sixteenth embodiment of this invention is described as follows. The hardware arrangement of the sixteenth embodiment is similar to the conventional arrangement which is shown in FIGS. 20 to 22.

The sixteenth embodiment is arranged by way of example not to vary the power-decreased state detection threshold value A shown in FIG. 27. As described in the foregoing with reference to FIGS. 20 to 22, a power-decreased state detecting circuit has been included in some of the known video cameras. The threshold value which is to be used in deciding a power-decreased state has also been determined in a manner as represented by the threshold value A in FIG. 27. Therefore, this embodiment permits the use of the threshold value A as it is.

Figure 37:
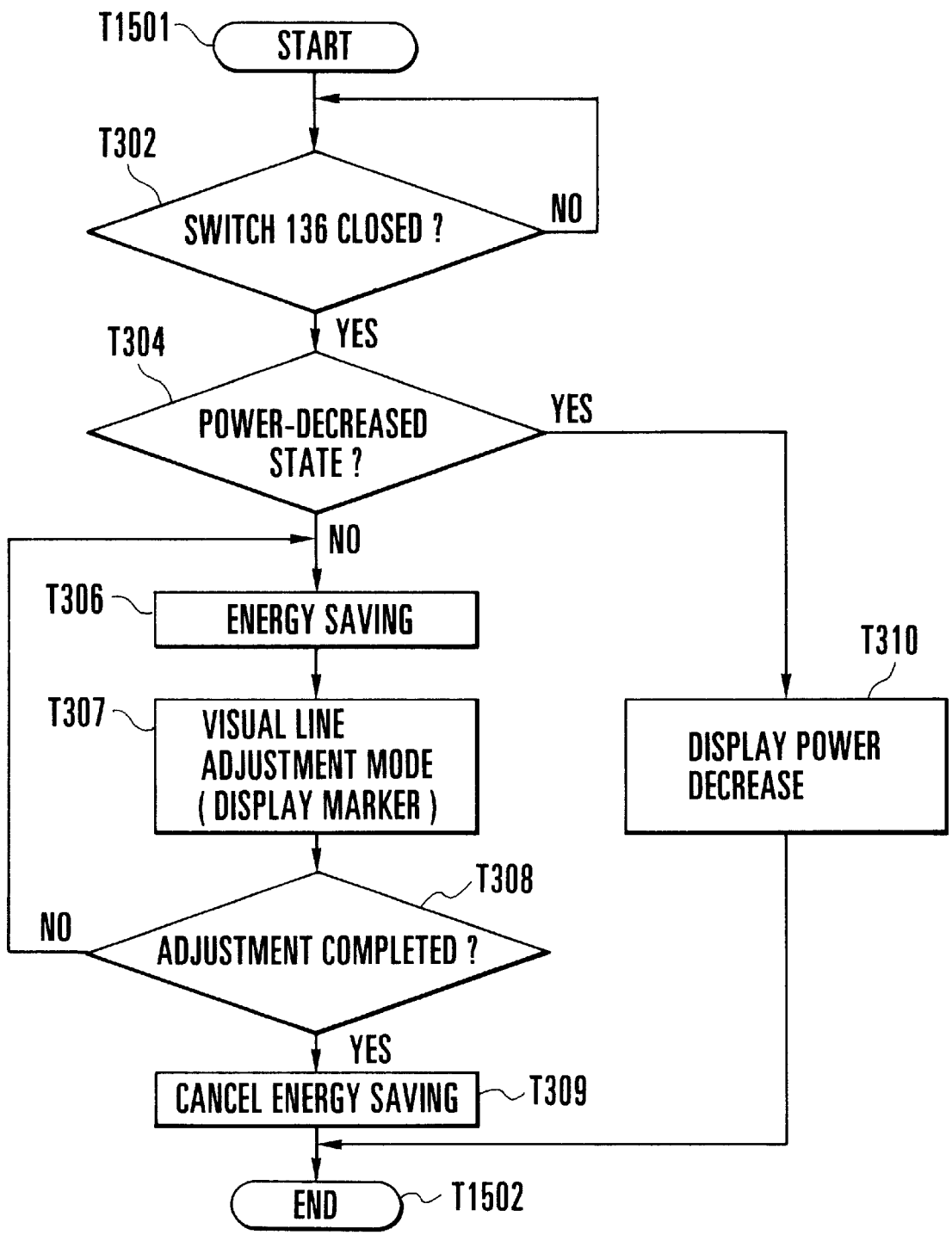
FIG. 37 is a flow chart showing the operation of a sixteenth embodiment of this invention.

Referring to FIG. 37, when the flow of operation begins to be executed at a step T1501, the flow comes to the step T302 to find if the switch 136 is closed. If so, the flow comes to the step T304 to make a check for a power-decreased state. The power-decreased state detection threshold value to be used at the step T304 is determined by the resistors 304 and 305 as mentioned in the foregoing with reference to FIGS. 20 to 22. In this case, the threshold value is not particularly adjusted for the visual-line adjustment mode. If the battery 128 is found to be not in a power-decreased state at the step T304, the flow comes to the step T310 to display the decrease of power and does not come to the visual-line adjusting mode. If the battery 128 is found to be not in a power-decreased state, the flow comes to the step T306 to execute the energy saving process. After the energy saving process, the flow comes to the step T307 to make the visual-line adjustment. Upon completion of the visual-line adjustment, the flow comes to the step T309 to cancel the energy saving state. The flow then comes to a step T1502 to terminate the flow of operation.

The processes programmed as described above enable the embodiment to prevent any abnormal action on the storage element even though the embodiment has the same hardware arrangement as the one shown in FIGS. 20 to 22.

Further, the sixteenth embodiment may be arranged to include a timer like in the case of the tenth embodiment. With the timer included, since the power-decreased state detection threshold value is set at a low value as represented by the threshold value A shown in FIG. 27, the upper limit of the count value of the timer is set at a value which is lower than the value set in the tenth embodiment by an amount corresponding to the low threshold value. The length of time allowed for the adjustment then becomes shorter to reliably prevent any abnormal storing action.

The sixteenth embodiment and its modification can be changed to the form of executing the title selecting processes like in the cases of the eleventh and thirteenth embodiments.

With the embodiments arranged as described above, information is never erased or written from or into the storage element while the power supply is in a power-decreased state. The apparatus is thus effectively prevented from malfunctioning. Further, since the power-decreased state deciding conditions are arranged to be variable to facilitate the process of deciding a power-decreased state and the length of time allowable for erasing or writing is limited in carrying out control in response to an external operation, abnormal actions can be more reliably prevented.

What is claimed is:

1. An electronic apparatus comprising:
   mode setting means for setting a predetermined mode to execute a predetermined function;
   storage means for storing predetermined information in said predetermined mode;
   storage control means for rewriting the information stored in said storage means or for adding different information to the information stored in said storage means;
   detecting means for detecting an output level of a power source battery by comparing the output level with a predetermined reference level; and
   control means for changing the predetermined reference level of said detecting means in the case that said storage control means is rewriting the information stored in said storage means.

2. An apparatus according to claim 1, further comprising means for informing an operator of said apparatus of a condition wherein said detecting means detects that said power level is less than the predetermined reference level.

3. An apparatus according to claim 2, wherein said control means selects a lower level from among a plurality of detecting levels when the predetermined mode is set.

4. An apparatus according to claim 1, wherein said control means is arranged such that, in executing said storage means and said storage control means, a limit is set to a length of time allowable for the execution.

5. An apparatus according to claim 1, wherein a detecting level of said detecting means is variable.

6. An apparatus according to claim 5, wherein the detecting level of said detecting means is variable in response to completion or stopping of the execution of said storage means or said storage control means.

7. An apparatus according to claim 1, further including visual line detecting means for detecting a visual line of an operator, and wherein said storage means is arranged to store information on adjustment made by said visual line detecting means.

8. An apparatus according to claim 1, further comprising input means for inputting information on characters of a title or the like, said apparatus being a video camera, and wherein said storage means is arranged to store the information inputted by said input means.

9. An apparatus comprising:
   storage means for storing information;
   erasing/writing means for erasing or writing information from or into said storage means;
   deciding means for deciding a state of a power supply of said apparatus by comparing an output level of said power supply with a predetermined level; and
   control means arranged to allow said erasing/writing means to erase or write when the power supply is decided to be not in a power-decreased state by said deciding means and to change the predetermined level in the case that said erasing/writing means is in an operating state.

10. An apparatus according to claim 9, wherein said control means is arranged to cause said deciding means to vary a deciding level before making a decision.

11. An apparatus according to claim 9, wherein said control means is arranged to cause a display to be made indicating that an action of said erasing/writing means is not executable, when said power supply is decided to be in the state by said deciding means.

12. An apparatus according to claim 9, 10 or 11, further comprising means for limiting a length of time required for the execution of said erasing/writing means.

13. An apparatus according to claim 9, further comprising visual line detecting means for detecting a visual line of the operator, and wherein said information stored in said storage means is information on adjustment made by said visual line detecting means.

14. An apparatus according to claim 9, further comprising input means for inputting information on characters of a title or the like, said apparatus being a video camera, and wherein said storage means is arranged to store the information inputted by said input means.

15. An apparatus having an information storing function, comprising:
   storage means for storing information;
   erasing/writing means for erasing or writing information from or into said storage means;
   power reducing means for reducing a supply of power to a part of said apparatus that is not relative to the execution of said erasing/writing means; and
   control means arranged to cause said power reducing means to reduce the supply of power during a predetermined period of time and to allow said erasing/writing means to erase or write and to change a detection level for detecting a drop of an output level of said power during said predetermined period of time.

16. An apparatus according to claim 15, further comprising visual line detecting means for detecting a visual line of an operator, and wherein said information stored in said storage means is information on adjustment made by said visual line detecting means.

17. An apparatus according to claim 15, further comprising input means for inputting information on characters of a title or the like, said apparatus being a video camera, and wherein said storage means is arranged to store the information inputted by said input means.

18. An apparatus having an information storing function, comprising:
   operating means for executing a predetermined function;
   storage means for storing information relative to said operating means;
   erasing/writing means for erasing or writing information from or into said storage means;
   deciding means for deciding a state of a power supply of said apparatus by comparing an output level of said power supply with a predetermined level;
   power reducing means for reducing the supply of power to a part of said apparatus which is not related to the execution of said erasing/writing means; and control means for controlling said deciding means for changing the Predetermined level in the case that said erasing/writing means are operated and controlling said power reducing means according to an output of said deciding means so as to cause said power reducing means to reduce the supply of power during a selected period of time and said erasing/writing means to erase or write during said selected period of time when the power supply is decided to be not in a power-decreased state.

19. An apparatus according to claim 18, wherein said control means is arranged to cause said deciding means to vary a deciding level before performing a predetermined control in response to the instruction.

20. An apparatus according to claim 19, further comprising visual line detecting means for detecting a visual line of the operator, and wherein said information stored in said storage means is information on adjustment made by said visual line detecting means.

21. An apparatus according to claim 19, further comprising input means for inputting information on characters of a title or the like, said apparatus being a video camera, and wherein said storage means is arranged to store the information inputted by said input means.

22. An apparatus according to claim 18, wherein said control means is arranged to cause a display to be made indicating that an action of said erasing/writing means is not executable, when said power supply is decided to be in the power-decreased state by said deciding means.

23. An apparatus according to claim 18, further comprising visual line detecting means for detecting a visual line of the operator, and wherein said information is stored in said storage means is information on adjustment made by said visual line detecting means.

24. An apparatus according to claim 18, further comprising input means for inputting information on characters of a title or the like, said apparatus being a video camera, and wherein said storage means is arranged to store the information inputted by said input means.

25. An apparatus according to claim 18, 19 or 22, further comprising means for limiting a length of time required for the execution of said erasing/writing means.

26. An apparatus comprising:

storage means for storing information;

erasing/writing means for erasing or writing information from or into said storage means;

deciding means for deciding a state of a power supply of said apparatus by comparing an output level of said power supply with one of a plurality of predetermined levels; and selection means for selecting one of the plurality of the predetermined levels for use by said deciding means in making a decision; and control means responsive to a decision made by said deciding means for allowing or not allowing said erasing/writing means to perform an erasing or a writing of information from or into said storage means.

* * * * *

UNITED STATES PATENT AND TRADEMARK OFFICE
CERTIFICATE OF CORRECTION

PATENT NO. : 5,986,706
DATED : November 16, 1999
INVENTOR(S) : Masahide Hirasawa It is certified that error appears in the above-identified patent and that said Letters Patent is hereby corrected as shown below:

Col. 2, line 38, delete "lines-29" and insert -- lines 29 --.
Col. 22, line 36, delete "s electing" and insert -- selecting --.
Col. 23, line 54, delete "t he" and insert - the --.
Col. 29, line 2, delete "Predetermined" and insert -- predetermined --.

Signed and Sealed this

Tenth Day of April, 2001

Attest:

NICHOLAS P. GODICI

Attesting Officer

Acting Director of the United States Patent and Trademark Office